United States Patent
Stern et al.

(10) Patent No.: US 10,863,238 B2
(45) Date of Patent: Dec. 8, 2020

(54) ZONE CONTROL METHODS AND APPARATUS

(71) Applicant: Time Warner Cable Enterprises LLC, New York, NY (US)

(72) Inventors: Peter Stern, Greenwich, CT (US); Kenneth Gould, Reston, VA (US)

(73) Assignee: TIME WARNER CABLE ENTERPRISE LLC, St. Louis, MO (US)

( * ) Notice: Subject to any disclaimer, the term of this patent is extended or adjusted under 35 U.S.C. 154(b) by 493 days.

(21) Appl. No.: 14/252,686

(22) Filed: Apr. 14, 2014

(65) Prior Publication Data
US 2014/0317657 A1 Oct. 23, 2014

Related U.S. Application Data

(63) Continuation of application No. 12/766,753, filed on Apr. 23, 2010, now Pat. No. 8,701,138.

(51) Int. Cl.
*H04N 7/10* (2006.01)
*H04N 21/45* (2011.01)
(Continued)

(52) U.S. Cl.
CPC ..... *H04N 21/4524* (2013.01); *H04L 12/2801* (2013.01); *H04N 21/2225* (2013.01);
(Continued)

(58) Field of Classification Search
CPC .......... H04N 21/4524; H04N 21/6118; H04N 21/2225; H04N 21/2547; H04N 21/6125; H04N 21/812
(Continued)

(56) References Cited

U.S. PATENT DOCUMENTS

| 4,521,881 A | 6/1985 | Stapleford et al. |
| 4,546,382 A | 10/1985 | McKenna et al. |

(Continued)

FOREIGN PATENT DOCUMENTS

| WO | WO-0191474 A2 | 11/2001 |
| WO | WO-2010008487 A1 | 1/2010 |

(Continued)

OTHER PUBLICATIONS

American national Standard. ANSI/SCTE 35 2012. Digital Program Insertion Cueing Message for Cable, by Society of Cable Telecommunication Engineers. 2012.
(Continued)

*Primary Examiner* — Pankaj Kumar
*Assistant Examiner* — Sahar Aqil Riaz
(74) *Attorney, Agent, or Firm* — Gadzinski & Associates, PC

(57) ABSTRACT

Methods and apparatus for providing control over targeted secondary content based on a zone associated with a user. In one exemplary embodiment, a user request for primary content from a non-legacy device results in the delivery of the same secondary content which would have been provided had the request been generated at a legacy device (so-called "zone preservation"). To accomplish this, the devices are associated with a user's zone at a zone preservation server in communication with the server providing content to the devices. The zone preservation server associates each user with an advertisement zone identifier, and utilizes the identifier to direct the delivery of primary and secondary content. In another embodiment, a prescribed rule set for one or more zones is employed, such as where certain types of advertisements or secondary content are inserted given a particular device or user context.

24 Claims, 14 Drawing Sheets

(51) Int. Cl.
*H04N 21/2547* (2011.01)
*H04N 21/61* (2011.01)
*H04N 21/81* (2011.01)
*H04L 12/28* (2006.01)
*H04N 21/2225* (2011.01)

(52) U.S. Cl.
CPC ..... *H04N 21/2547* (2013.01); *H04N 21/6118* (2013.01); *H04N 21/6125* (2013.01); *H04N 21/812* (2013.01)

(58) Field of Classification Search
USPC .................................................. 725/31–35
See application file for complete search history.

(56) References Cited

U.S. PATENT DOCUMENTS

| | | | |
|---|---|---|---|
| 4,602,279 A | 7/1986 | Freeman | |
| 4,905,080 A | 2/1990 | Watanabe et al. | |
| 4,930,120 A | 5/1990 | Baxter et al. | |
| 5,155,591 A | 10/1992 | Wachob | |
| 5,373,315 A | 12/1994 | Dufresne et al. | |
| 5,481,294 A | 1/1996 | Thomas et al. | |
| 5,497,185 A | 3/1996 | Dufresne et al. | |
| 5,600,364 A | 2/1997 | Hendricks et al. | |
| 5,675,647 A | 10/1997 | Garneau et al. | |
| 5,724,525 A * | 3/1998 | Beyers, II ............ | G06Q 20/102 348/E7.063 |
| 5,758,257 A | 5/1998 | Herz et al. | |
| 5,774,170 A | 6/1998 | Hite et al. | |
| 5,793,409 A | 8/1998 | Tetsumura | |
| 5,812,642 A | 9/1998 | Leroy | |
| 5,862,312 A | 1/1999 | Mann et al. | |
| 5,914,945 A | 6/1999 | Abu-Amara et al. | |
| 5,929,849 A | 7/1999 | Kikinis | |
| 5,956,037 A | 9/1999 | Osawa et al. | |
| 5,963,844 A | 10/1999 | Dail | |
| 5,974,299 A | 10/1999 | Massetti | |
| 6,002,393 A | 12/1999 | Hite et al. | |
| 6,016,316 A | 1/2000 | Moura et al. | |
| 6,029,045 A | 2/2000 | Picco et al. | |
| 6,047,327 A | 4/2000 | Tso et al. | |
| 6,081,830 A | 6/2000 | Schindler | |
| 6,088,722 A | 7/2000 | Herz et al. | |
| 6,124,878 A | 9/2000 | Adams et al. | |
| 6,134,532 A | 10/2000 | Lazarus et al. | |
| 6,161,142 A | 12/2000 | Wolfe et al. | |
| 6,169,728 B1 | 1/2001 | Perreault et al. | |
| 6,177,931 B1 | 1/2001 | Alexander et al. | |
| 6,182,050 B1 | 1/2001 | Ballard | |
| 6,202,210 B1 | 3/2001 | Ludtke | |
| 6,211,901 B1 | 4/2001 | Imajima et al. | |
| 6,216,129 B1 | 4/2001 | Eldering | |
| 6,272,176 B1 | 8/2001 | Srinivasan | |
| 6,282,713 B1 | 8/2001 | Kitsukawa et al. | |
| 6,292,624 B1 | 9/2001 | Saib et al. | |
| 6,330,609 B1 | 12/2001 | Garofalakis et al. | |
| 6,389,538 B1 | 5/2002 | Gruse et al. | |
| 6,396,055 B1 | 5/2002 | Biedendorf | |
| 6,446,261 B1 | 9/2002 | Rosser | |
| 6,463,585 B1 | 10/2002 | Hendricks et al. | |
| 6,467,089 B1 | 10/2002 | Aust et al. | |
| 6,502,076 B1 | 12/2002 | Smith | |
| 6,549,718 B1 | 4/2003 | Grooters et al. | |
| 6,560,578 B2 | 5/2003 | Eldering | |
| 6,601,237 B1 | 7/2003 | Ten et al. | |
| 6,604,138 B1 | 8/2003 | Virine et al. | |
| 6,615,039 B1 | 9/2003 | Eldering | |
| 6,615,251 B1 | 9/2003 | Klug et al. | |
| 6,647,548 B1 | 11/2003 | Lu et al. | |
| 6,671,736 B2 | 12/2003 | Virine et al. | |
| 6,681,393 B1 | 1/2004 | Bauminger et al. | |
| 6,687,735 B1 | 2/2004 | Logston et al. | |
| 6,700,624 B2 | 3/2004 | Yun | |
| 6,704,930 B1 | 3/2004 | Eldering et al. | |
| 6,718,551 B1 | 4/2004 | Swix et al. | |
| 6,725,461 B1 | 4/2004 | Dougherty et al. | |
| 6,738,978 B1 | 5/2004 | Hendricks et al. | |
| 6,742,187 B1 | 5/2004 | Vogel | |
| 6,769,127 B1 | 7/2004 | Bonomi et al. | |
| 6,771,290 B1 | 8/2004 | Hoyle | |
| 6,775,843 B1 | 8/2004 | McDermott | |
| 6,785,901 B1 | 8/2004 | Horiwitz et al. | |
| 6,813,776 B2 | 11/2004 | Chernock et al. | |
| 6,859,845 B2 | 2/2005 | Mate | |
| 6,898,762 B2 | 5/2005 | Ellis et al. | |
| 6,901,606 B2 | 5/2005 | Wright et al. | |
| 6,909,837 B1 | 6/2005 | Unger | |
| 6,915,528 B1 | 7/2005 | McKenna, Jr. | |
| 6,917,614 B1 | 7/2005 | Laubach et al. | |
| 6,917,641 B2 | 7/2005 | Kotzin et al. | |
| 6,990,680 B1 | 1/2006 | Wugofski | |
| 7,017,179 B1 | 3/2006 | Asamoto et al. | |
| 7,024,676 B1 | 4/2006 | Klopfenstein | |
| 7,039,928 B2 | 5/2006 | Kamada et al. | |
| 7,075,945 B2 | 7/2006 | Arsenault et al. | |
| 7,100,183 B2 | 8/2006 | Kunkel et al. | |
| 7,109,848 B2 | 9/2006 | Schybergson | |
| 7,143,431 B1 | 11/2006 | Eager et al. | |
| 7,146,627 B1 | 12/2006 | Ismail et al. | |
| 7,152,237 B2 | 12/2006 | Flickinger et al. | |
| 7,155,508 B2 | 12/2006 | Sankuratripati et al. | |
| 7,174,126 B2 | 2/2007 | McElhatten | |
| 7,191,461 B1 | 3/2007 | Arsenault et al. | |
| 7,197,472 B2 | 3/2007 | Conkwright et al. | |
| 7,213,036 B2 | 5/2007 | Apparao et al. | |
| 7,222,078 B2 | 5/2007 | Abelow | |
| 7,228,555 B2 | 6/2007 | Schlack | |
| 7,237,250 B2 | 6/2007 | Kanojia et al. | |
| 7,242,988 B1 | 7/2007 | Hoffberg et al. | |
| 7,246,150 B1 | 7/2007 | Donoho et al. | |
| 7,246,172 B2 | 7/2007 | Yoshiba et al. | |
| 7,266,836 B2 | 9/2007 | Anttila et al. | |
| 7,280,737 B2 | 10/2007 | Smith | |
| 7,281,261 B2 | 10/2007 | Jaff et al. | |
| 7,317,728 B2 | 1/2008 | Acharya et al. | |
| 7,327,692 B2 | 2/2008 | Ain et al. | |
| 7,352,775 B2 | 4/2008 | Powell | |
| 7,355,980 B2 | 4/2008 | Bauer et al. | |
| 7,356,751 B1 | 4/2008 | Levitan | |
| 7,357,775 B1 | 4/2008 | Koh | |
| 7,363,371 B2 | 4/2008 | Kirby et al. | |
| 7,363,643 B2 | 4/2008 | Drake et al. | |
| 7,367,043 B2 | 4/2008 | Dudkiewicz et al. | |
| 7,369,750 B2 | 5/2008 | Cheng et al. | |
| 7,444,655 B2 | 10/2008 | Sardera | |
| 7,457,520 B2 | 11/2008 | Rossetti | |
| 7,567,983 B2 | 7/2009 | Pickelsimer et al. | |
| 7,577,118 B2 | 8/2009 | Haumonte et al. | |
| 7,592,912 B2 | 9/2009 | Hasek et al. | |
| 7,602,820 B2 | 10/2009 | Helms | |
| 7,603,529 B1 | 10/2009 | MacHardy et al. | |
| 7,650,319 B2 | 1/2010 | Hoffberg et al. | |
| 7,712,125 B2 | 5/2010 | Herigstad et al. | |
| 7,720,432 B1 | 5/2010 | Colby et al. | |
| 7,729,940 B2 | 6/2010 | Harvey et al. | |
| 7,730,509 B2 | 6/2010 | Boulet et al. | |
| 7,763,360 B2 | 7/2010 | Paul | |
| 7,783,316 B1 | 8/2010 | Mitchell | |
| 7,801,803 B2 | 9/2010 | Forlai | |
| 7,900,052 B2 | 3/2011 | Jonas et al. | |
| 7,900,229 B2 | 3/2011 | Dureau | |
| 7,954,131 B2 | 5/2011 | Cholas et al. | |
| 8,024,762 B2 | 9/2011 | Britt | |
| 8,028,322 B2 | 9/2011 | Riedl et al. | |
| 8,042,131 B2 | 10/2011 | Flickinger | |
| 8,065,703 B2 | 11/2011 | Wilson et al. | |
| 8,073,460 B1 * | 12/2011 | Scofield ................. | G06Q 30/02 455/414.1 |
| 8,078,696 B2 | 12/2011 | Lajoie et al. | |
| 8,090,014 B2 | 1/2012 | Cheung et al. | |
| 8,090,104 B2 | 1/2012 | Wajs et al. | |
| 8,095,610 B2 | 1/2012 | Gould et al. | |
| 8,099,757 B2 | 1/2012 | Riedl | |

(56) References Cited

U.S. PATENT DOCUMENTS

| | | | |
|---|---|---|---|
| 8,151,294 B2 | 4/2012 | Carlucci et al. |
| 8,156,520 B2 | 4/2012 | Casagrande et al. |
| 8,181,209 B2 | 5/2012 | Hasek |
| 8,205,226 B2 | 6/2012 | Ko et al. |
| 8,214,256 B2 | 7/2012 | Riedl |
| 8,280,982 B2 | 10/2012 | La et al. |
| 8,296,185 B2 | 10/2012 | Isaac |
| 8,341,242 B2 | 12/2012 | Dillon et al. |
| 8,347,341 B2 | 1/2013 | Markley et al. |
| 8,365,213 B1 | 1/2013 | Orlowski |
| 8,396,055 B2 | 3/2013 | Patel et al. |
| 8,396,056 B2 | 3/2013 | Dalton, Jr. et al. |
| 8,472,371 B1 * | 6/2013 | Bari ................ H04W 8/06 370/328 |
| 8,484,511 B2 | 7/2013 | Engel et al. |
| 8,516,529 B2 | 8/2013 | Lajoie et al. |
| 8,561,113 B2 | 10/2013 | Cansler et al. |
| 8,561,116 B2 | 10/2013 | Hasek |
| 8,571,931 B2 | 10/2013 | Riedl et al. |
| 8,621,501 B2 | 12/2013 | Matheny et al. |
| 8,769,559 B2 | 7/2014 | Moon et al. |
| 8,838,149 B2 | 9/2014 | Hasek |
| 9,021,566 B1 | 4/2015 | Panayotopoulos et al. |
| 9,215,423 B2 | 12/2015 | Kimble et al. |
| 9,400,875 B1 | 7/2016 | Barraclough et al. |
| 2001/0001160 A1 | 5/2001 | Shoff et al. |
| 2001/0013123 A1 | 8/2001 | Freeman et al. |
| 2002/0026496 A1 | 2/2002 | Boyer et al. |
| 2002/0032754 A1 | 3/2002 | Logston et al. |
| 2002/0049902 A1 | 4/2002 | Rhodes |
| 2002/0059577 A1 | 5/2002 | Lu et al. |
| 2002/0059602 A1 | 5/2002 | MacRae et al. |
| 2002/0059619 A1 | 5/2002 | Lebar |
| 2002/0069404 A1 | 6/2002 | Copeman et al. |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. et al. |
| 2002/0100063 A1 | 7/2002 | Herigstad et al. |
| 2002/0104083 A1 | 8/2002 | Hendricks et al. |
| 2002/0104096 A1 | 8/2002 | Cramer et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129368 A1 | 9/2002 | Schlack et al. |
| 2002/0144263 A1 | 10/2002 | Eldering et al. |
| 2002/0147984 A1 | 10/2002 | Tomsen et al. |
| 2002/0154655 A1 | 10/2002 | Gummalla et al. |
| 2002/0163928 A1 | 11/2002 | Rudnick et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2003/0004810 A1 | 1/2003 | Eldering |
| 2003/0005446 A1 | 1/2003 | Jaff et al. |
| 2003/0018977 A1 | 1/2003 | McKenna |
| 2003/0020744 A1 | 1/2003 | Ellis et al. |
| 2003/0023489 A1 * | 1/2003 | McGuire ............. G06Q 30/02 705/14.55 |
| 2003/0030751 A1 | 2/2003 | Lupulescu et al. |
| 2003/0033199 A1 | 2/2003 | Coleman |
| 2003/0056217 A1 | 3/2003 | Brooks |
| 2003/0077067 A1 | 4/2003 | Wu et al. |
| 2003/0086422 A1 | 5/2003 | Klinker et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115601 A1 | 6/2003 | Palazzo et al. |
| 2003/0115612 A1 | 6/2003 | Mao et al. |
| 2003/0123465 A1 | 7/2003 | Donahue |
| 2003/0135513 A1 | 7/2003 | Quinn et al. |
| 2003/0140351 A1 | 7/2003 | Hoarty et al. |
| 2003/0145323 A1 | 7/2003 | Hendricks et al. |
| 2003/0145329 A1 * | 7/2003 | Candelore ......... H04N 21/2347 725/87 |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0172374 A1 | 9/2003 | Vinson et al. |
| 2003/0172376 A1 | 9/2003 | Coffin |
| 2003/0177495 A1 | 9/2003 | Needham et al. |
| 2003/0198461 A1 | 10/2003 | Taylor et al. |
| 2003/0217365 A1 | 11/2003 | Caputo |
| 2003/0220100 A1 | 11/2003 | McElhatten et al. |
| 2003/0229681 A1 | 12/2003 | Levitan |
| 2003/0237090 A1 | 12/2003 | Boston et al. |
| 2004/0003400 A1 * | 1/2004 | Carney ................. G06Q 30/02 725/42 |
| 2004/0034873 A1 | 2/2004 | Zenoni |
| 2004/0047599 A1 | 3/2004 | Grzeczkowski |
| 2004/0060076 A1 | 3/2004 | Song |
| 2004/0070678 A1 | 4/2004 | Toyama et al. |
| 2004/0073915 A1 | 4/2004 | Dureau |
| 2004/0078809 A1 | 4/2004 | Drazin |
| 2004/0083177 A1 | 4/2004 | Chen et al. |
| 2004/0103429 A1 | 5/2004 | Carlucci et al. |
| 2004/0109672 A1 | 6/2004 | Kim et al. |
| 2004/0117817 A1 | 6/2004 | Kwon et al. |
| 2004/0133467 A1 | 7/2004 | Siler |
| 2004/0138909 A1 | 7/2004 | Mayer |
| 2004/0148625 A1 | 7/2004 | Eldering et al. |
| 2004/0163109 A1 | 8/2004 | Kang et al. |
| 2004/0163111 A1 | 8/2004 | Palazzo et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0194134 A1 | 9/2004 | Gunatilake et al. |
| 2004/0199789 A1 | 10/2004 | Shaw et al. |
| 2004/0230994 A1 | 11/2004 | Urdang et al. |
| 2005/0002638 A1 | 1/2005 | Putterman et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055685 A1 | 3/2005 | Maynard et al. |
| 2005/0060742 A1 | 3/2005 | Riedl et al. |
| 2005/0060745 A1 | 3/2005 | Riedl et al. |
| 2005/0086334 A1 | 4/2005 | Aaltonen et al. |
| 2005/0086691 A1 | 4/2005 | Dudkiewicz et al. |
| 2005/0105396 A1 | 5/2005 | Schybergson |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0138656 A1 | 6/2005 | Moore et al. |
| 2005/0144635 A1 | 6/2005 | Boortz et al. |
| 2005/0160308 A1 | 7/2005 | Elcock et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0251827 A1 | 11/2005 | Ellis et al. |
| 2005/0262542 A1 | 11/2005 | Deweese et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2006/0019702 A1 | 1/2006 | Anttila et al. |

(56) References Cited

U.S. PATENT DOCUMENTS

| | | |
|---|---|---|
| 2006/0031883 A1 | 2/2006 | Ellis et al. |
| 2006/0036750 A1 | 2/2006 | Ladd et al. |
| 2006/0037060 A1 | 2/2006 | Simms et al. |
| 2006/0059532 A1 | 3/2006 | Dugan et al. |
| 2006/0080408 A1 | 4/2006 | Istvan et al. |
| 2006/0117341 A1 | 6/2006 | Park |
| 2006/0128397 A1 | 6/2006 | Choti et al. |
| 2006/0130113 A1 | 6/2006 | Carlucci et al. |
| 2006/0139379 A1 | 6/2006 | Toma et al. |
| 2006/0165082 A1 | 7/2006 | Pfeffer et al. |
| 2006/0171390 A1 | 8/2006 | La |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218604 A1 | 9/2006 | Riedl et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz et al. |
| 2006/0277569 A1 | 12/2006 | Smith |
| 2006/0287915 A1* | 12/2006 | Boulet ............... G06Q 30/02 705/14.61 |
| 2006/0288374 A1 | 12/2006 | Ferris et al. |
| 2006/0294259 A1 | 12/2006 | Matefi et al. |
| 2007/0014293 A1 | 1/2007 | Filsfils et al. |
| 2007/0022459 A1* | 1/2007 | Gaebel, Jr. ............ H04N 7/165 725/114 |
| 2007/0029379 A1 | 2/2007 | Peyer |
| 2007/0033531 A1 | 2/2007 | Marsh |
| 2007/0061023 A1 | 3/2007 | Hoffberg et al. |
| 2007/0074258 A1 | 3/2007 | Wood et al. |
| 2007/0076728 A1 | 4/2007 | Rieger et al. |
| 2007/0088852 A1* | 4/2007 | Levkovitz .......... H04L 12/1859 709/246 |
| 2007/0089127 A1 | 4/2007 | Flickinger et al. |
| 2007/0094691 A1 | 4/2007 | Gazdzinski |
| 2007/0094692 A1 | 4/2007 | De |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0136777 A1 | 6/2007 | Hasek |
| 2007/0150919 A1 | 6/2007 | Morishita |
| 2007/0157228 A1* | 7/2007 | Bayer ................... G06Q 30/02 725/34 |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204308 A1* | 8/2007 | Nicholas ........... H04N 7/17318 725/86 |
| 2007/0204310 A1 | 8/2007 | Hua et al. |
| 2007/0217436 A1 | 9/2007 | Markley |
| 2007/0233857 A1 | 10/2007 | Cheng et al. |
| 2007/0239536 A1 | 10/2007 | Bollapragada |
| 2007/0244760 A1 | 10/2007 | Bodnar et al. |
| 2007/0276925 A1 | 11/2007 | La Joie |
| 2007/0276926 A1 | 11/2007 | Lajoie et al. |
| 2007/0280298 A1 | 12/2007 | Hearn et al. |
| 2008/0016526 A1 | 1/2008 | Asmussen |
| 2008/0022309 A1 | 1/2008 | Begeja et al. |
| 2008/0027801 A1* | 1/2008 | Walter ................... G06Q 30/02 705/14.52 |
| 2008/0052157 A1 | 2/2008 | Kadambi et al. |
| 2008/0066095 A1 | 3/2008 | Reinoso |
| 2008/0092058 A1* | 4/2008 | Afergan ................ H04L 67/02 715/745 |
| 2008/0092181 A1 | 4/2008 | Britt |
| 2008/0109853 A1 | 5/2008 | Einarsson et al. |
| 2008/0115169 A1 | 5/2008 | Ellis et al. |
| 2008/0124056 A1 | 5/2008 | Concotelli |
| 2008/0147497 A1 | 6/2008 | Tischer |
| 2008/0155588 A1 | 6/2008 | Roberts et al. |
| 2008/0163305 A1 | 7/2008 | Johnson et al. |
| 2008/0168487 A1 | 7/2008 | Chow et al. |
| 2008/0170551 A1 | 7/2008 | Zaks |
| 2008/0184344 A1 | 7/2008 | Hernacki et al. |
| 2008/0189617 A1 | 8/2008 | Covell et al. |
| 2008/0192820 A1 | 8/2008 | Brooks et al. |
| 2008/0200154 A1 | 8/2008 | Maharajh et al. |
| 2008/0201736 A1 | 8/2008 | Gordon et al. |
| 2008/0215755 A1 | 9/2008 | Farber et al. |
| 2008/0229354 A1 | 9/2008 | Morris et al. |
| 2008/0235746 A1 | 9/2008 | Peters et al. |
| 2008/0256615 A1 | 10/2008 | Schlacht et al. |
| 2008/0263578 A1 | 10/2008 | Bayer et al. |
| 2008/0271068 A1 | 10/2008 | Ou et al. |
| 2008/0271070 A1 | 10/2008 | Kanojia et al. |
| 2008/0273591 A1 | 11/2008 | Brooks et al. |
| 2008/0301727 A1* | 12/2008 | Cristofalo .............. G06Q 30/02 725/35 |
| 2008/0306903 A1 | 12/2008 | Larson et al. |
| 2008/0307454 A1 | 12/2008 | Ahanger et al. |
| 2008/0313671 A1 | 12/2008 | Batrouny et al. |
| 2008/0313691 A1 | 12/2008 | Cholas et al. |
| 2009/0006211 A1 | 1/2009 | Perry et al. |
| 2009/0030802 A1 | 1/2009 | Plotnick et al. |
| 2009/0076898 A1* | 3/2009 | Wang ................. G06Q 30/0258 705/14.56 |
| 2009/0077583 A1 | 3/2009 | Sugiyama et al. |
| 2009/0083279 A1 | 3/2009 | Hasek |
| 2009/0086643 A1 | 4/2009 | Kotrla et al. |
| 2009/0094347 A1 | 4/2009 | Ting et al. |
| 2009/0119703 A1 | 5/2009 | Piepenbrink et al. |
| 2009/0132346 A1 | 5/2009 | Duggal et al. |
| 2009/0132347 A1* | 5/2009 | Anderson ............... G06Q 30/02 705/14.52 |
| 2009/0133048 A1 | 5/2009 | Gibbs et al. |
| 2009/0150917 A1 | 6/2009 | Huffman et al. |
| 2009/0187939 A1 | 7/2009 | Lajoie |
| 2009/0187941 A1* | 7/2009 | Smith ................. H04L 12/1854 725/35 |
| 2009/0210899 A1 | 8/2009 | Lawrence-Apfelbaum et al. |
| 2009/0228941 A1 | 9/2009 | Russell et al. |
| 2009/0248794 A1 | 10/2009 | Helms et al. |
| 2009/0319379 A1 | 12/2009 | Joao |
| 2009/0320059 A1 | 12/2009 | Bolyukh |
| 2009/0327057 A1* | 12/2009 | Redlich .................. G06Q 30/02 705/14.2 |
| 2010/0005527 A1 | 1/2010 | Jeon |
| 2010/0027560 A1 | 2/2010 | Yang et al. |
| 2010/0027787 A1 | 2/2010 | Benkert et al. |
| 2010/0036720 A1* | 2/2010 | Jain ....................... G06Q 30/02 705/14.13 |
| 2010/0057560 A1 | 3/2010 | Skudlark et al. |
| 2010/0107194 A1 | 4/2010 | McKissick et al. |
| 2010/0114696 A1 | 5/2010 | Yang |
| 2010/0115091 A1 | 5/2010 | Park et al. |
| 2010/0115540 A1 | 5/2010 | Fan et al. |
| 2010/0121936 A1 | 5/2010 | Liu et al. |
| 2010/0122276 A1 | 5/2010 | Chen |
| 2010/0125658 A1 | 5/2010 | Strasters |
| 2010/0131973 A1 | 5/2010 | Dillon |
| 2010/0132003 A1 | 5/2010 | Bennett et al. |
| 2010/0146541 A1* | 6/2010 | Velazquez ............. H04H 20/59 725/33 |
| 2010/0151882 A1 | 6/2010 | Gillies et al. |
| 2010/0161492 A1 | 6/2010 | Harvey et al. |
| 2010/0162367 A1 | 6/2010 | Lajoie et al. |
| 2010/0169503 A1* | 7/2010 | Kollmansberger ........................ H04L 67/2804 709/231 |
| 2010/0175084 A1 | 7/2010 | Ellis et al. |
| 2010/0175584 A1 | 7/2010 | Kusaka et al. |
| 2010/0186029 A1 | 7/2010 | Kim et al. |
| 2010/0218231 A1 | 8/2010 | Frink et al. |
| 2010/0251304 A1 | 9/2010 | Donoghue |
| 2010/0251305 A1 | 9/2010 | Kimble et al. |
| 2010/0262461 A1* | 10/2010 | Bohannon ............... G06Q 20/02 705/38 |
| 2010/0262488 A1 | 10/2010 | Harrison et al. |
| 2010/0262999 A1 | 10/2010 | Curran |

(56) References Cited

U.S. PATENT DOCUMENTS

| | | |
|---|---|---|
| 2010/0269131 A1 | 10/2010 | Newberry et al. |
| 2010/0275226 A1 | 10/2010 | Kitazato |
| 2010/0280641 A1 | 11/2010 | Harkness et al. |
| 2010/0293047 A1 | 11/2010 | Schwarz et al. |
| 2010/0313225 A1 | 12/2010 | Cholas |
| 2010/0333137 A1* | 12/2010 | Hamano ............... H04H 60/46 725/39 |
| 2011/0015989 A1 | 1/2011 | Tidwell et al. |
| 2011/0016479 A1 | 1/2011 | Tidwell |
| 2011/0016482 A1 | 1/2011 | Tidwell et al. |
| 2011/0055866 A1 | 3/2011 | Piepenbrink et al. |
| 2011/0058675 A1 | 3/2011 | Brueck et al. |
| 2011/0083069 A1 | 4/2011 | Paul et al. |
| 2011/0083144 A1 | 4/2011 | Bocharov et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1* | 5/2011 | Lajoie ............... H04L 65/1016 370/352 |
| 2011/0107364 A1 | 5/2011 | Lajoie et al. |
| 2011/0107379 A1 | 5/2011 | Lajoie et al. |
| 2011/0110515 A1 | 5/2011 | Tidwell et al. |
| 2011/0138064 A1 | 6/2011 | Rieger et al. |
| 2011/0154383 A1 | 6/2011 | Hao et al. |
| 2011/0178880 A1 | 7/2011 | Karaoguz et al. |
| 2011/0178943 A1 | 7/2011 | Motahari et al. |
| 2011/0223944 A1 | 9/2011 | Gosselin |
| 2011/0231265 A1 | 9/2011 | Brown et al. |
| 2011/0231660 A1 | 9/2011 | Kanungo |
| 2011/0246616 A1 | 10/2011 | Ronca et al. |
| 2011/0258049 A1 | 10/2011 | Ramer et al. |
| 2011/0264530 A1 | 10/2011 | Santangelo |
| 2011/0265116 A1 | 10/2011 | Stern et al. |
| 2011/0302624 A1 | 12/2011 | Chen et al. |
| 2011/0307339 A1 | 12/2011 | Russell et al. |
| 2011/0307920 A1 | 12/2011 | Blanchard et al. |
| 2011/0317977 A1 | 12/2011 | Harris |
| 2012/0008786 A1 | 1/2012 | Cronk et al. |
| 2012/0011269 A1 | 1/2012 | Krikorian et al. |
| 2012/0030363 A1 | 2/2012 | Conrad |
| 2012/0072526 A1 | 3/2012 | Kling et al. |
| 2012/0076015 A1 | 3/2012 | Pfeffer |
| 2012/0079523 A1 | 3/2012 | Trimper et al. |
| 2012/0084813 A1 | 4/2012 | Dmitriev et al. |
| 2012/0089699 A1 | 4/2012 | Cholas |
| 2012/0096106 A1 | 4/2012 | Blumofe et al. |
| 2012/0110620 A1 | 5/2012 | Kilar et al. |
| 2012/0124161 A1 | 5/2012 | Tidwell et al. |
| 2012/0124606 A1 | 5/2012 | Tidwell et al. |
| 2012/0124612 A1 | 5/2012 | Adimatyam et al. |
| 2012/0137332 A1 | 5/2012 | Kumar |
| 2012/0144195 A1 | 6/2012 | Nair et al. |
| 2012/0151077 A1 | 6/2012 | Finster |
| 2012/0159539 A1 | 6/2012 | Berberet et al. |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0174150 A1 | 7/2012 | Reddy et al. |
| 2012/0185693 A1 | 7/2012 | Chen et al. |
| 2012/0246462 A1 | 9/2012 | Moroney et al. |
| 2012/0278833 A1 | 11/2012 | Tam et al. |
| 2012/0284804 A1 | 11/2012 | Lindquist et al. |
| 2012/0308071 A1 | 12/2012 | Ramsdell et al. |
| 2012/0324552 A1 | 12/2012 | Padala et al. |
| 2013/0029716 A1* | 1/2013 | Lee ............... H04W 4/005 455/519 |
| 2013/0031578 A1 | 1/2013 | Zhu et al. |
| 2013/0041747 A1 | 2/2013 | Anderson et al. |
| 2013/0046849 A1 | 2/2013 | Wolf et al. |
| 2013/0114940 A1 | 5/2013 | Merzon et al. |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0174271 A1 | 7/2013 | Handal et al. |
| 2013/0179588 A1 | 7/2013 | McCarthy et al. |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2013/0227608 A1 | 8/2013 | Evans et al. |
| 2014/0012843 A1 | 1/2014 | Soon-Shiong |
| 2014/0020017 A1 | 1/2014 | Stern et al. |
| 2014/0033252 A1 | 1/2014 | Radloff et al. |
| 2014/0230003 A1 | 8/2014 | Ma et al. |
| 2014/0245341 A1 | 8/2014 | Mack et al. |
| 2014/0259182 A1 | 9/2014 | Mershon |
| 2015/0109122 A1 | 4/2015 | Stern et al. |
| 2015/0163540 A1 | 6/2015 | Masterson |
| 2016/0241617 A1 | 8/2016 | Jelley et al. |

FOREIGN PATENT DOCUMENTS

| | | |
|---|---|---|
| WO | WO-2011035443 A1 | 3/2011 |
| WO | WO-2011053858 A1 | 5/2011 |

OTHER PUBLICATIONS

Apple Inc, The apparatus and methods of H1TP Live Streaming Overview, Apr. 1, 2011.

Open Cable Specifications Alternate Content Real-Time Event Signaling and Management API by Cable Television Laboratories. Inc. 2012.

SCTE Standards Document ANSUSCTE 118-2 2007 entitled Program-Specific Ad Insertion—Content Provider to Traffic Communication Applications Data Model.

SCTE Standards Document ANSUSCTE 130-1 2008 entitled Digital Progra section Advertising Systems Interfaces.

Zarnbell °T he Apparatus and Methods of HS Smooth Streaming Technical Overview, Mar. 2009.

Open Cable Specification entitled "Enhanced TV Binary Interchange Format 1 0" 0C-SP-ETV-131F1.0-106-110128 dated Jan. 28, 2011, 408 pages.

Tandberg Television specification entitled "AdPoint.RTM. Advanced Advertising Platform" dated Mar. 2008, 2 pages.

UTF-32, IBM, retrieved from http://publib.boulder.ibm.com/infocenter/iseries/v5r3/index.jsp?topic=%2FnIs%2Frbagsutf32.htm on Aug. 28, 2013.

* cited by examiner

ZONE CONTROL METHODS AND APPARATUS

PRIORITY

This application is a continuation of and claims priority to co-owned U.S. patent application Ser. No. 12/766,753 of the same title filed Apr. 23, 2010, issuing as U.S. Pat. No. 8,701,138 on Apr. 15, 2014, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of network service and content delivery and utilization, and specifically in one aspect to delivering such services and content to particular subsets or groupings within the user base of a content distribution network.

2. Description of Related Technology

In the context of network services, it is often highly desirable to provide users of the network with ready and instant access to a variety of different types of content, accessible at different locations, and on different platforms. In many cases, it is also desirable to provide the same user with "secondary" content (such as e.g., advertisements, promotions or "info-mercials", related shorts, telescoping information/advertisements, hyperlinks, etc.). The secondary content may be directly or indirectly related to the "primary" content which the user selected in the first place (such as via a common theme or context, common persons of interest, common demographic factors, etc.), or can be totally unrelated.

Delivery of secondary content may comprise a major source of revenue for commercial television or movie distributors, and for the network operator. For example, where the secondary content comprises advertisements, it may be a main source of income for national television broadcasters and their local over-the-air affiliates. Cable, satellite, hybrid fiber-copper (HFCu), and other content distribution networks, as well as Internet content providers, also derive income from the sale of advertising time and insertion opportunities (or "impressions").

Moreover, an advertiser may seek to maximize the return on their advertising investment by targeting specific users or groups of users that are likely to be most receptive to the commercial message embodied in the advertisements. The aforementioned selective "targeting" and delivery of content to e.g., subscribers in a cable network is generally well known in the prior art. For example, it may be desirable to include certain types of advertising at specific demographic or geographic segments of an MSO's subscriber base. One way of targeting viewers involves selecting advertisements based on a geographical region in which the advertisement is to be delivered; i.e., a so-called "advertisement zone". In other words, it is advantageous to provide certain advertising content to viewers in one local or regional area which is different than that provided to the viewers in a different local or regional area.

For example, the advertisements may be limited by the geographic area in which a business operates. Hence, it typically only makes financial sense for an advertisement for that business to be provided in geographical areas where the business is operated or provides services. Similar logic applies to the demographic, psychographic, and other planes; e.g., an advertisement for a super-high end sports car would likely be wasted when delivered to lower middle-class households or subscribers (which may or may not be correlated to geography), as would an advertisement for a feminine product delivered to a predominantly male audience. Additionally, the context of the primary content may not be compatible with particular types/themes of secondary content (e.g., a VOD movie having a non-violent theme might not mesh optimally with advertisements for UFC sporting or boxing events, regardless of demographics or geography).

Hence, as used herein, the term "advertising zone" may include the delivery of advertisements, promotions, or other secondary content with an actual geographic zone, a demographic "zone" or logical space, a psychographic zone or logical space, a user-based preference space, a primary/secondary content context space, and so forth.

In a typical U.S. cable or terrestrial content distribution system, downstream RF channels used for transmission each occupy a 6 MHz spectral slot in the available bandwidth (between approximately 54 MHz and 870 MHz). Established analog and digital cable television services including standard definition (SD) broadcasts utilize this spectrum. The spectrum is also shared with the deployment of next-generation services such as video on-demand (VOD), high definition (HD) broadcast/simulcast services, personal video recorder (PVR), and digital video recorder (DVR) services, as well as high-speed data (HSD). For this reason, the exact RF (physical) channel used for a given service may differ from plant to plant. However, within a given cable plant, all homes that are electrically connected to the same cable feed running through a neighborhood will receive the same downstream signal. For the purpose of managing services, these homes are grouped into logical aggregations or clusters typically called "service groups". Homes belonging to the same service group generally receive their services (e.g., broadcast or VOD service) on the same set of RF channels.

In current cable systems, a correct advertising zone may be determined for a legacy STB through use of a Service Group ID (Service_Group_id). Specifically, when the STB boots up, it learns its Service_Group_id from the edge QAM (eQAM) from which it receives video (each such eQAM is manually configured to be associated with a Service_Group_id). When the VOD client on the STB requests a primary content element (e.g. video), the Service_Group_id is contained in the requesting message. The application server receives the message, extracts the Service_Group_id, performs a lookup to determine which advertising zone is associated with that Service_Group_id, and then instructs the VOD server to serve the appropriate version of the requested video which contains the secondary content associated with the STB's advertising zone.

This architecture, however, is generally not optimal for the delivery of targeted content based on e.g., geographic or logical boundaries, since inter alia the level of targeting granularity that can be achieved is very low (i.e., there is a lack of precision in determining who receives what). Geographic boundaries (or zones) are not precise, and often do not overlap well with the network distribution configuration—a service group may in fact straddle two or more geographic regions of interest (e.g., zip codes, metropolitan markets, etc). Accordingly, it is often impossible for network operator to draw precise lines of demarcation between different subsets or groups of its viewers. As a simple case, consider where an operator wishes to deliver particular content to all of the residents of Town X. Depending on where Town X is situated in proximity to its neighbors, its residents may be served by multiple different distribution nodes or hubs of a cable system. Or, certain portions of the Town may be serviced by one system operator and other portions by another. This can lead to very crude and imprecise delivery of content, with a potentially significant rate of error (error here being defined as instances where content should have been delivered to a particular premises but wasn't, or alternatively should not have been delivered but was).

Further, this architecture (as well as other prior art architectures enabling distribution of content to devices outside the traditional home network) is not optimal for the delivery of targeted content to devices capable of utilizing the now-ubiquitous Internet Protocol (so called "IP devices"). Under the prior art, video destined for an IP device would be served to that device by a web or Internet video streamer such as Real Network's Helix™ Server, Microsoft® SilverLight™, or Adobe® video server. These servers comprise separate entities from the VOD servers that are used to serve on-demand content to non-IP devices, referred to herein as "legacy devices" (e.g., set-top boxes). Thus, according to the prior art, in order to serve content having the same inserted advertisements to both IP and legacy devices, various operationally "painful" (aka complex) mechanisms are required for maintaining two advertisement insertion systems, two video server systems, and in some cases two advertisement campaign managers, each of the foregoing serving either the legacy devices or the non-legacy (e.g., IP) devices, yet being synchronized to ensure that the same advertisements are inserted for viewing on the separate platforms. As one may imagine, this approach is costly, time consuming, and prone to error.

Moreover, the MSO, content source (e.g., studio), and/or advertiser may wish to apply other rules to secondary content selection and insertion (i.e., in addition to or in place of the aforementioned zone preservation). For instance, an MSO might want to give its subscriber the ability to tailor the secondary content it receives based on e.g., the subscriber's preferences, the subscriber's location, etc. Current secondary content selection and insertion paradigms are substantially limited in this regard, being based on Service_Group_id or the like as previously described.

Hence, apparatus and methods for providing primary content having secondary content inserted therein which is targeted to individual ones of a plurality of users such as based on geographic or other logical boundaries (or alternatively the context or other attributes of the primary content) are desired. Ideally, these apparatus and methods would provide linear and non-linear content to non-legacy video-consuming devices (including personal computers (PCs), digital set-top boxes (DSTBs), portable media devices (PMDs), etc.) with the advertisements appropriate to the consumer's advertisement zone embedded therein. The apparatus and methods would thereby enable the user of the devices to see the same advertisement that he/she would see if that user had requested to view the same programming on his/her legacy device, or alternatively see other secondary content according to a prescribed rule set or preference selected by the subscriber, MSO, content source, or even the advertiser. Secondary content insertion methods and apparatus which targets the user, the device, and/or is related to the context of the primary content, would also ideally be provided such that it could be meshed with preservation of the desired advertising "zone" (or imposition of the alternative rule set or preferences) in a cohesive fashion.

SUMMARY OF THE INVENTION

The present invention satisfies the foregoing needs by providing improved apparatus and methods for zone-preserved secondary content delivery such as may be used in a content distribution (e.g., cable, HFCu or satellite) network.

In a first aspect of the invention, a method of ensuring delivery of program content and advertising content is disclosed. In one embodiment, the program content is delivered "on-demand" from a content delivery network to an Internet Protocol (IP)-capable user device, the advertising being selected based at least in part on an advertisement zone of a user of the IP-capable user device, and the method comprises: receiving a request for the program content from the IP capable user device, the request comprising at least a user identifier (UID); forwarding the UID to an entity of the network, the entity determining at least a Media Access Control (MAC) address of the IP capable user device from the UID; receiving from the entity the MAC address; forwarding the MAC address to a network controller of the network, the network controller determining at least a quadrature amplitude modulation (QAM) identifier using the MAC address; receiving from the network controller the QAM identifier; associating the QAM identifier to the advertisement zone; and providing information regarding the advertisement zone to a content server of the network, the content server providing the program and the advertising content to the IP capable user device.

In one variant, the user of the IP-capable user device is able to receive the same advertising content that the user would receive if the request had originated from a non-IP device associated to the user.

In a second aspect of the invention, a method for use in a content delivery network is disclosed. In one embodiment, the content delivery network is capable of providing program and advertising content to a plurality of legacy and non-legacy devices, and the method ensures delivery of zone-preserved advertising content. The method of this embodiment comprises: receiving a request for program content from a non-legacy device, the device being associated with a user, the request comprising at least information identifying the user; forwarding the information identifying the user to at least one entity of the network, the entity being configured to associate the information to an address of the user; receiving an indicator of the address from the at least one entity; associating the indicator to at least one advertising zone; and providing information regarding the at least one advertising zone to a content server of the network, the content server being configured to provide the program and the advertising content to the legacy and non-legacy devices. The advertising content received at the non-legacy device comprises the same content which would have been received by the user at a legacy device.

In a third aspect of the invention, a server apparatus is disclosed. In one embodiment, the apparatus is for use in a content distribution network comprising at least a content server and a plurality of user devices capable of receiving primary and secondary content therefrom, and comprises a secondary content zone preservation server apparatus. In one variant, the apparatus comprises a first interface configured to receive a request from at least one of the plurality of user devices, the request comprising at least user identification information; a storage entity configured to store a plurality of records thereon, the records indicating at least one secondary content zone applicable to individual ones of a plurality of device indicators; a digital processor, the processor configured to run at least one computer program thereon, the computer program comprising a plurality of instructions which are configured to determine at least one secondary content zone by: forwarding the user identification information to a network entity capable of providing a device indicator; receiving the device indicator; and comparing the device indicator to the plurality of records to identify at least one secondary content zone associated therewith; and a second interface configured to provide data related to the at least one secondary content zone to the content server.

In a fourth aspect of the invention, a method of delivering primary and secondary content over a network is disclosed. In one embodiment, the method comprises: receiving a request for the primary content from a packet-enabled user device; receiving entitlement information relating to a subscriber making the request; using the entitlement information to associate the subscriber to a subscriber account, the account indicating the subscriber is authorized to receive the requested primary content; and delivering the primary content to the subscriber in a packetized format via the packet-enabled device, the primary content having secondary content contained therein which is zone-controlled with respect to delivery of the primary content via another non-packet enabled device of the subscriber.

In a fifth aspect of the invention, a method of operating a network is disclosed. In one embodiment, the method comprises: receiving a user preference regarding advertising; creating a rule based on the preference; and implementing the rule with respect to requests for primary content that are received via one or more IP-enabled devices of the user that are located at a location different than the user's premises.

In a sixth aspect of the invention, a method of operating a network is disclosed. In one embodiment, the method comprises: receiving a request for primary content from an IP-enabled device of a user of the network; determining a first location of the device; and selecting and inserting secondary content that have one or more common attributes to secondary content that would be selected and inserted if the request were received from a non-IP enabled device of the user at a location different from the first location.

In a seventh aspect of the invention, network apparatus is disclosed. In one embodiment, the apparatus comprises: a processor; a storage device in data communication with the processor; and at least one computer program capable of being run on the processor and being stored in the storage device. The at least one program is capable of, when executed: receiving a request for primary content originated from a user; and if the request originated from a legacy device of the user, determining an advertising zone associated with that legacy device; or if the request originated from an IP-enabled non-legacy device of the user, applying the same rules for advertising selection or insertion that are applied for the advertising zone associated with the legacy device.

In an eighth aspect of the invention, a system is disclosed. In one embodiment, the system comprises a zone control and preservation server, a VOD server, and an entitlements server.

In a ninth aspect of the invention, a computer-readable apparatus is disclosed. In one embodiment, the apparatus comprises a medium having one or more computer programs stored thereon, the one or more programs being configured to implement advertising zone control and/or preservation within a content delivery network.

In a tenth aspect, a method of operating a network is disclosed. In one embodiment, the method comprises: receiving a preference regarding advertising; creating a rule based on the preference; and causing the rule to be implemented with respect to requests for primary content that are received via one or more IP-enabled devices associated to a user that are located at a location different than a location of a premises of the user.

In an eleventh aspect, an apparatus configured to operate in a network is disclosed. In one embodiment, the apparatus comprises: an interface in communication with a mobile user device; a storage apparatus; and a processor configured to execute at least one computer program thereon, the computer program comprising a plurality of instructions configured to, when executed: (i) receive a request for primary content from a mobile user device; (ii) identify a user associated to the mobile user device; (iii) identify a zone associated to the user; (iv) cause one or more of a plurality of secondary content elements to be inserted into the requested primary content for delivery to the mobile user device based at least in part on a rule for the insertion thereof. The rule comprises selection of the one or more secondary content elements selected from among the plurality based at least in part on: a correspondence of the one or more secondary content elements to the identified zone associated to the user; and a time-based qualification associated to the one or more secondary content elements.

In a twelfth aspect, a network apparatus is disclosed. In one embodiment, the network apparatus comprises: a processor; a storage device in data communication with the processor: and at least one computer program configured to run on the processor and stored in the storage device, the at least one program comprising a plurality of instructions configured to, when executed: (i) receive a request for primary content originated from a user, the request comprising at least an address, and the primary content comprising a plurality of content segments; (ii) identify individual ones of a plurality of secondary content based on a secondary content zone of the user; and (iii) cause individual ones of the plurality of content segments of the primary content to have the individual ones of the plurality of secondary content inserted therebetween. The plurality of instructions are further configured to: when the request originated from a legacy device of the user, base said secondary content zone on the address associated with the legacy device; and when the request originated from an IP-enabled non-legacy device of the user, utilize a secondary content zone associated with the legacy device.

In a thirteenth aspect, a network server apparatus is disclosed. In one embodiment, the zone preservation server apparatus comprises: a first interface configured to receive a request from at least one of the plurality of user devices associated with the network, the request comprising at least user identification information; a storage entity configured to store a plurality of records thereon, the plurality of records configured to indicate at least one secondary content zone applicable to individual ones of a plurality of device indicators; a digital processor, the processor configured to run at least one computer program thereon, the computer program comprising a plurality of instructions configured to, when executed: (i) forward the user identification information to a network entity configured to provide a device indicator; (ii) receive the device indicator; and (iii) compare the device indicator to the plurality of records to identify at least one secondary content zone associated therewith; and a second interface configured to pass data related to the at least one secondary content zone to a content server, the content server configured to provide content to at least the at least one user device.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
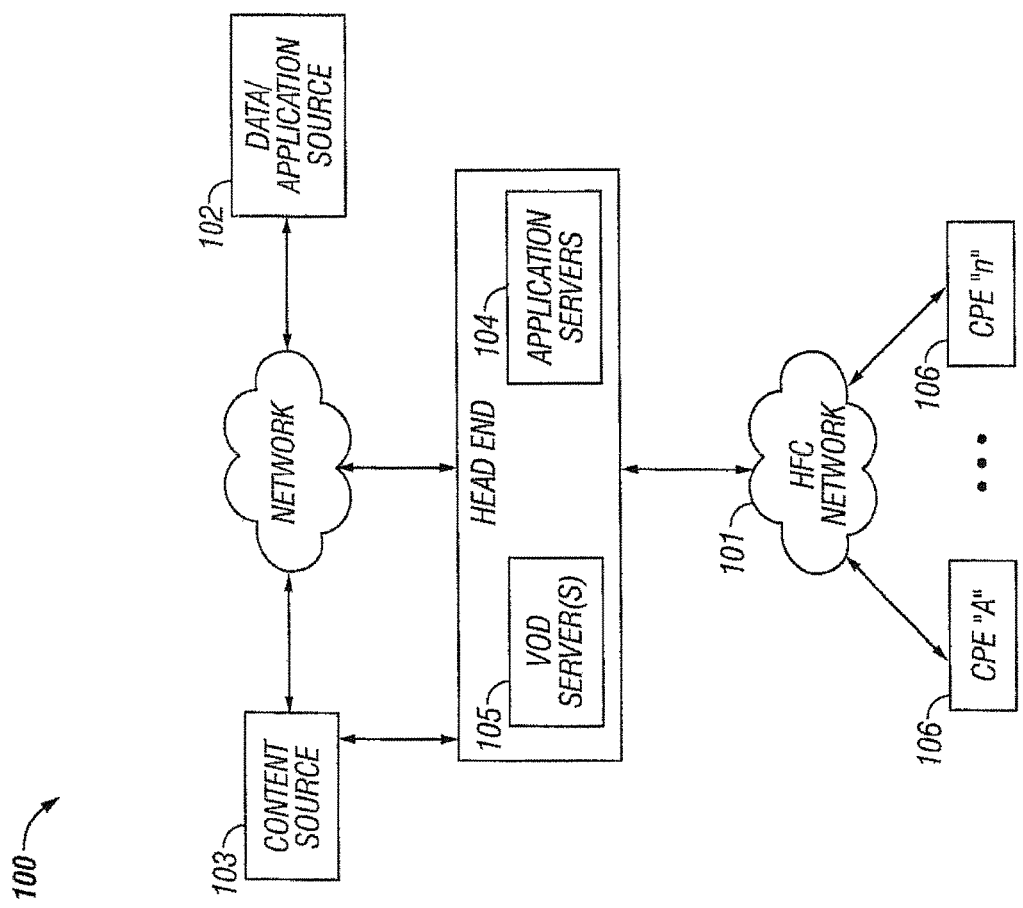
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "user device" include, but are not limited to, personal computers (PCs) and minicomputers, whether desktop, laptop, or otherwise, set-top boxes (e.g., DSTBs), mobile devices such as personal digital assistants (PDAs), handheld computers, personal communicators, cellular telephones, wireless nodes (e.g., WiFi APs or STAs), or literally any other device capable of interchanging data with a network, as well as personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Customer Premises Equipment (CPE)" and "host device" refer to any type of electronic equipment located within a customer's or user's premises and connected to a network. The term "host device" refers generally and without limitation to a terminal device that has access to digital television content via a satellite, cable, or terrestrial network. The host device functionality may be integrated into a digital television (DTV) set or other type of consumer electronic device (e.g., BluRay player). The term "customer premises equipment" (CPE) includes electronic equipment such as for example set-top boxes (e.g., DSTBs), televisions, cable or other modems, HFCu receivers, embedded multimedia terminal adapters (eMTAs), whether stand-alone or integrated with other devices, Digital Video Recorders (DVR), gateways/storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system and/or may be "virtual" or network-based rather than located at any customer premises.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, on-demand/PPV, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the teens "network" and "bearer network" refer generally to any type of telecommunications or data network including, without limitation, hybrid fiber coax (HFC) or hybrid fiber copper (HFCu) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications, PHY, or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB 2.0, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a, b, g, n), WiMAX (802.16), PAN (802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to one or more of the schemes.

As used herein, the term "server" refers to any computerized component, system or entity regardless of form which is adapted to provide data, files, applications, content, or other services to one or more other devices or entities on a computer network.

As used herein, the term "service group" refers to either a group of service users (e.g. subscribers) or the resources shared by them in the form of entire cable RF signals, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), flash drives or cards (e.g., USB or Compact Flash), or any other devices or media capable of storing content or other information.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, FLO (i.e., forward-link only systems such as Qualcomm MediaFLO), analog cellular, CDPD, satellite systems, millimeter wave or microwave systems, acoustic, and infrared (i.e., IrDA).

As used herein, the term "zone" refers to, without limitation, any actual, geographic, logical, or virtual zone or implementation rule as specified by one or more criteria. For example, a geographic zone may be specified by one or more postal zip codes, telephone area codes/exchanges, or the like. Alternatively, a logical zone or rule may be specified by membership in an organization, subscription to a particular service, or the like.

Overview

The present invention discloses, inter alia, methods and apparatus for selectively providing targeted content to a user based at least in part on a logical, geographic, or other "zone" or space associated with the user. In one embodiment, when the user requests primary content at a non-legacy device (e.g., an IP-capable device such as an IP-enabled DSTB, portable computer, or 3G/4G smartphone), the secondary content that is provided therewith is the same secondary content which would have been provided to the user had the request been generated at a legacy device; i.e. the "zone" (whether geographic, demographic, psychographic, or otherwise) is preserved.

In one implementation of the invention, a non-legacy device is associated with a user's zone by introducing a link between a server providing content to the device (e.g., a VOD server or web server) and a server which has the ability to determine an appropriate zone for the user. This is accomplished for example by associating each user with an advertisement zone identifier. Alternatively, the foregoing may be accomplished by associating each user with a device that is associated with a physical hub or node identifier, which, in turn, is associated with an advertisement zone identifier. In yet another variant, a service group identifier (rather than advertisement zone identifier) may be used.

The exemplary apparatus for making the aforementioned association may utilize the advertisement zone identifier (or service group identifier) to direct the delivery of primary and secondary content. For example, if on-demand content is requested by an IP-enabled client device, signals are sent to the VOD server (or web server) which indicate which secondary content (e.g., advertisements) should be placed in the primary content prior to delivery to the user, based on a determination of the zone associated with the user of the device.

Alternatively, in another embodiment of the invention, the zone may purposely be not preserved, but rather implemented according to one or more prescribed or dynamically determined rules which determine appropriate alternate secondary content based on e.g., a user, device, and/or primary content context. These rules may be determined by, inter alia, (i) the advertiser or a designated campaign manager or entity; (ii) the primary content source; (iii) the MSO or other network operator; and/or (iv) the receiving subscriber themselves. Relationships between the zones or contexts may also be applied, such as where advertising for use with content requested by an IP-enabled device "off network" maintains a common theme or attribute with that delivered with the same content "on-net", yet is not identical.

The present invention advantageously overcomes several disabilities of the prior art including the requirement for intricate, separate, and yet coordinated systems for providing targeted secondary content delivery to subscribers across the same or multiple different networks and types of devices (e.g., legacy and non-legacy devices), as well as the ability to selectively apply customized secondary content rule sets based on the context of a user, their device, and/or the primary content with which the secondary content is associated.

Additional secondary content targeting and insertion methods are also described, wherein the relationship between two ostensibly requesting devices (e.g., legacy DSTB and IP-enabled device) is leveraged for selection of secondary content as part of an advertising campaign management strategy.

An improved network server and CPE capable of implementing the aforementioned zone enforcement and targeting methodologies is also described, as well as mechanisms to implement operational and/or business rules during system operation.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system or satellite network architecture having multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while aspects of the invention are described generally in the context of a consumer (i.e., home) end user domain or premises, the invention may be readily adapted to other types of environments (e.g., commercial/enterprise, government/military, university/educational, healthcare facility, etc.) as well. Myriad other applications are possible.

It is further noted that while described primarily in the context of a cable system with 6 MHz QAM-modulated RF channels, the present invention is applicable to literally any network topology or paradigm, and any frequency/bandwidth or modulation type, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of network and other protocols (and in fact bearer networks to include other internets and intranets) to implement the described functionality.

Moreover, while many aspects of the invention are described within the context of traditional linear broadcast or "on demand" services provided over e.g., a cable, satellite, of HFCu network, it will be appreciated that the concepts and apparatus described herein are readily extensible to other content delivery paradigms which provide content, including without limitation: (i) "pay per view"; and (ii) selection of a video for play via the Internet, such as via the "YouTube®" or other similar website.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1*a* (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
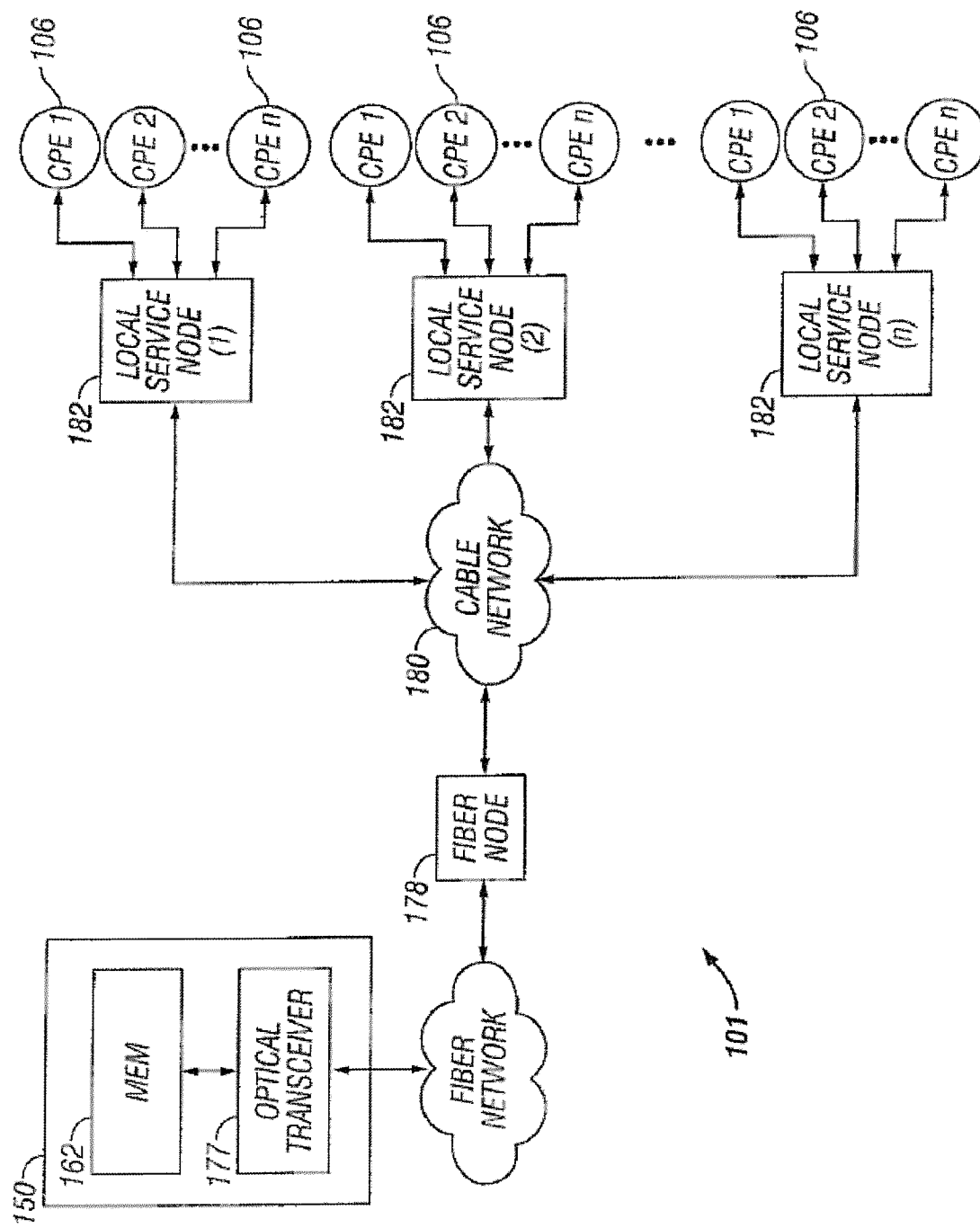
FIG. 1a is a functional block diagram illustrating one exemplary local service node configuration useful with the present invention.

FIG. 1a illustrates an exemplary configuration for the distribution portion of the network of FIG. 1.

Referring now to FIG. 1a, an exemplary local service node architecture is illustrated. As shown, a fiber network provides for communication between a fiber node 178 and a network headend 150.

The network headend 150 of the architecture of FIG. 1a includes at least a multiplexer-encrypter-modulator (MEM) 162 adapted to process or condition content for transmission over the network. As previously described, information is carried across multiple channels. Thus, in one embodiment, the MEM 162 is adapted to acquire the information for the carried channels from various sources (e.g., content distribution servers including VOD servers). Typically, the channels being delivered to the CPE 106 ("downstream") are multiplexed together at the MEM 162.

As shown in FIG. 1a, the output of the MEM 162 (e.g., multiplexed content in the form of an MPTS) is transferred to the optical domain via an optical transceiver 177 at the headend 150. However it is appreciated that the optical transceiver 177 may be located further downstream of the MEM 162 as well. The optical domain signals are then distributed to a fiber node 178, which then sends the signals over a distribution network 180 to a plurality of local servicing nodes 182. The local service nodes 182 each service a plurality of CPE 106, such as in a neighborhood. Intermediate RF and/or optical distribution systems may be included as well.

Figure 1B:
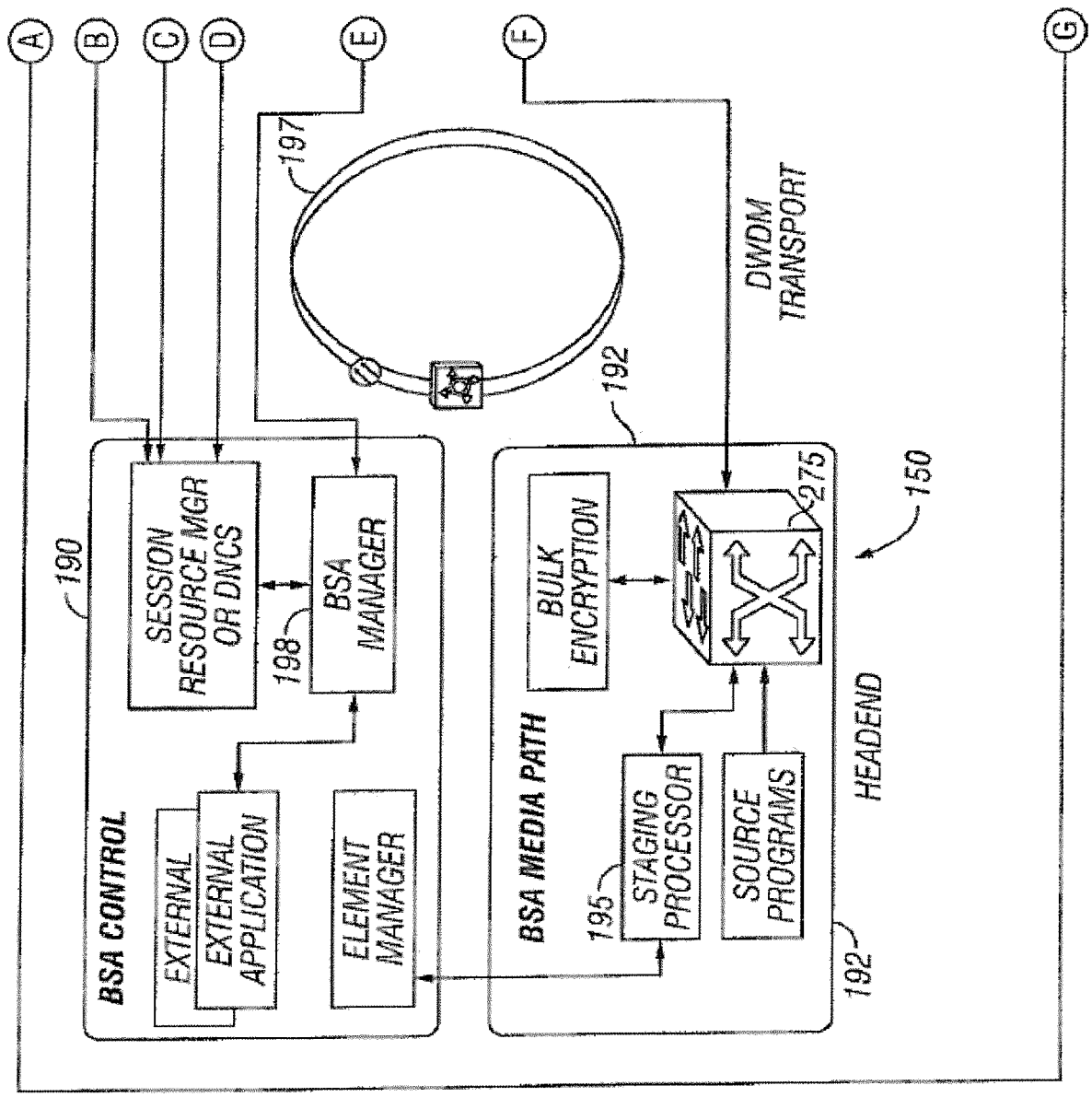
FIG. 1b is a functional block diagram illustrating one exemplary broadcast switched architecture (BSA) network useful with the present invention.
Figure 1B:
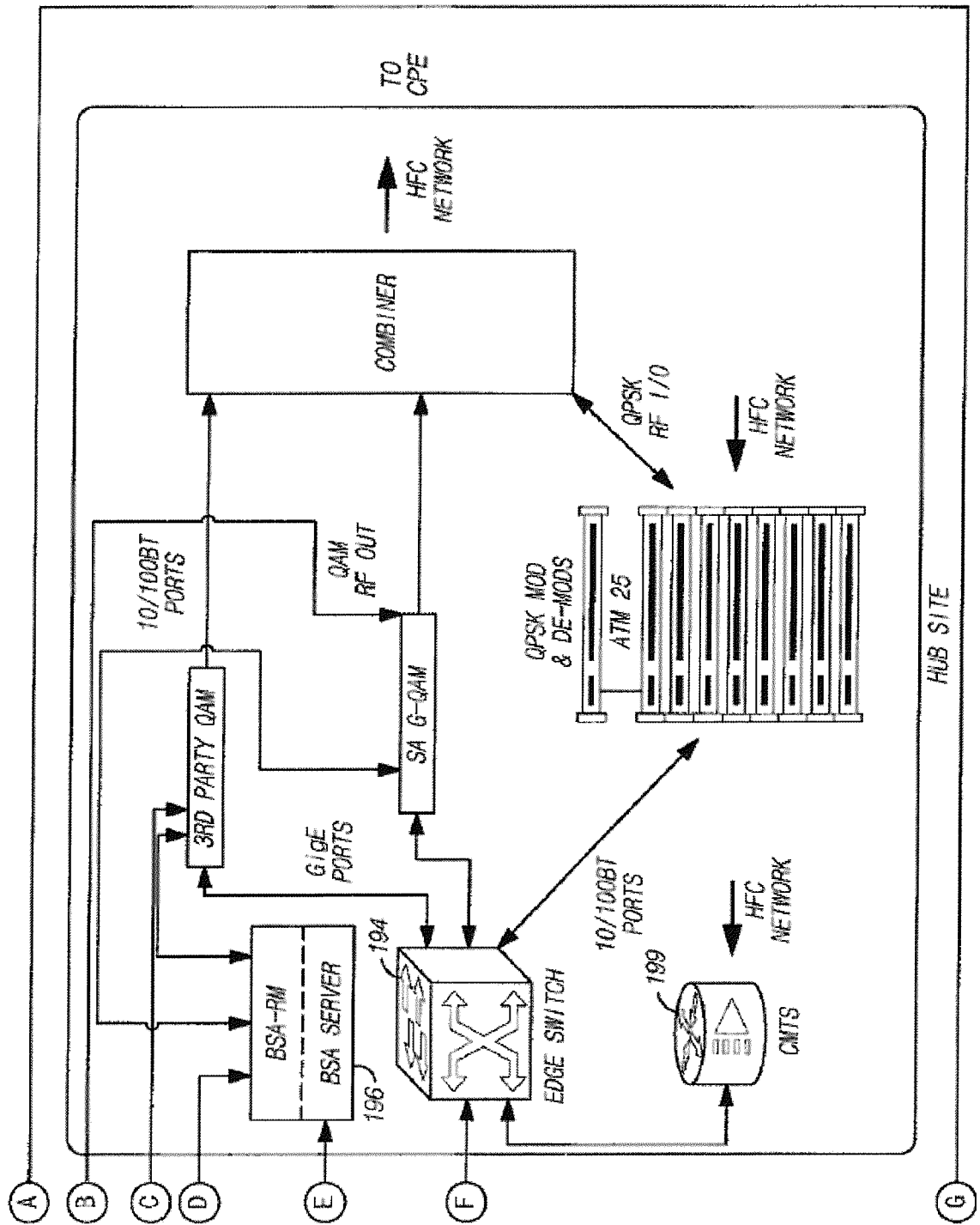

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1b provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK", now U.S. Pat. No. 7,602,820, incorporated herein by reference in its entirety, which discloses inter cilia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

The network headend 150 may further comprise a plurality of additional components and services omitted from FIG. 1a for clarity, including e.g., billing modules (discussed herein below), a subscriber management system (SMS) and CPE configuration management module, cable-modem termination system (CMTS) and OOB system, etc.

"Switched" Networks—

FIG. 1b illustrates an exemplary "switched" network architecture also useful with the apparatus and features of the present invention. While a so-called "broadcast switched architecture" or BSA network is illustrated in this one exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

In the present context, a switched network architecture can be used to deliver linear (e.g., broadcast) content, which may also have its advertising or other "zones" preserved (or subject to a prescribed rules set) as previously discussed.

FIG. 1b shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1-1b (and FIG. 1c, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG-, H.264, or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television (i.e., via a more traditional MPEG-2 encoded and multiplexed transport stream), and also as packetized IP data over the DOCSIS QAMs to the user's PC or other IP-enabled device via the user's cable modem. As will be described in greater detail below, other embodiments of the invention also allow for distribution of IP-packetized data (e.g., MPEG-2 or H.264 encoded video) over non-QAM based delivery channels, such as e.g., external packet-switched internets or WANs/MANs.

Referring again to FIG. 1b, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1C:
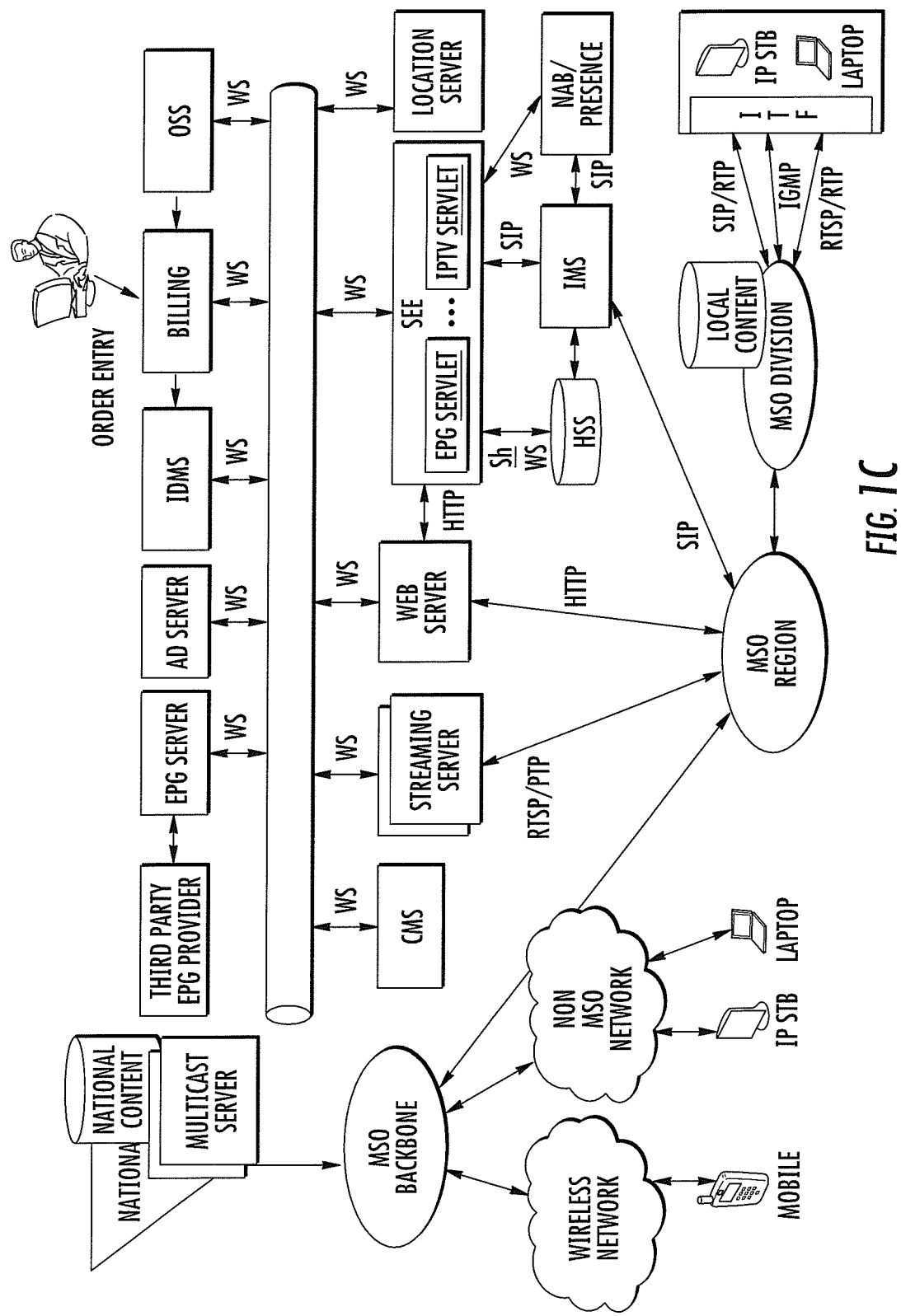
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1c illustrates one exemplary implementation of such a network, in the context of a 3GPP IMS (IP Multimedia Subsystem) network with common control plane and service delivery platform (SDP), as described in co-owned U.S. provisional patent application Ser. No. 61/256,903, filed Oct. 30, 2009 and entitled "METHODS AND APPARATUS FOR PACKETIZED CONTENT DELIVERY OVER A CONTENT DELIVERY NETWORK, incorporated herein by reference in its entirety. Such a network provides significant enhancements in terms of common control of different services, implementation and management of content delivery sessions according to unicast or multicast models, etc.; however, it is appreciated that the various features of the present invention are in no way limited to any of the foregoing architectures.

Zone-Controlled Secondary Content Delivery Architecture—

Figure 2A:
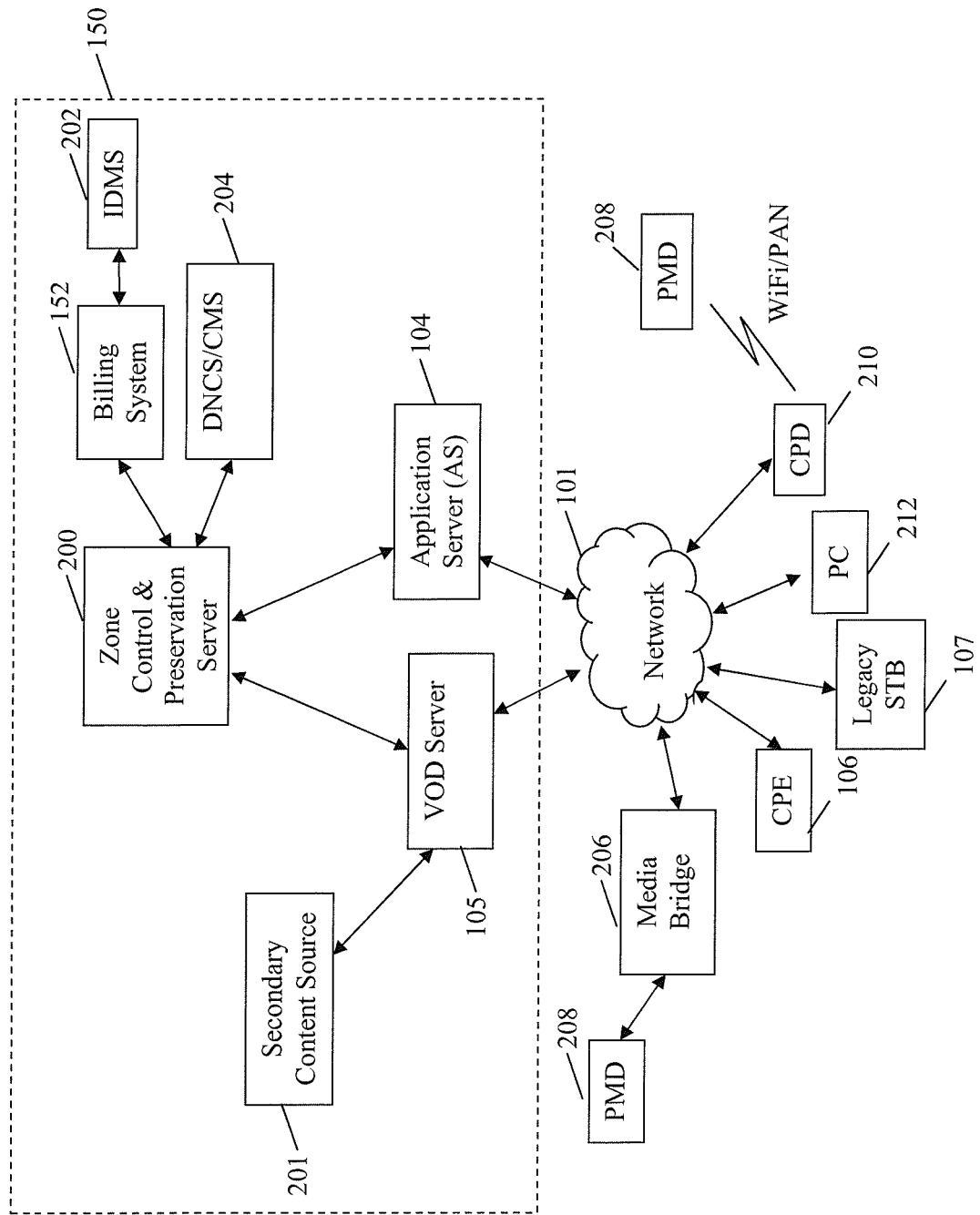
FIG. 2a is a functional block diagram illustrating an exemplary network configuration for zone-preserved secondary content delivery according to the present invention.

FIG. 2a illustrates a first exemplary network architecture for zone-controlled secondary content delivery according to one embodiment of the present invention. As shown, the architecture generally comprises a plurality of headend entities (e.g., installed at the headend 150 of the networks of FIGS. 1-1c described above) for providing primary and secondary content to a plurality of user devices. The user devices each individually belong to one or more "zones". The zones may be determined based on e.g., an actual physical boundary, geographic, logical, virtual or other boundary, or may be defined by a specified criteria. For example, a geographic zone may be specified by a postal zip code, a telephone area code, and/or a city/state limit or boundary. In one embodiment, the secondary content comprises advertising content which is targeted to the viewer based on a geographic region (or zone) in which the advertisement is to be broadcast, i.e., an advertisement zone. As a less intuitive example, a "zone" may be specified by membership in a population; e.g., all devices belonging to subscribers within a given demographic, or all devices belonging to "premium" level subscribers, etc. Many other types of zones will be appreciated by those of ordinary skill given the present disclosure.

As will be discussed in greater detail below, various user devices may be configured to receive the primary and secondary content according to the present invention. These devices include e.g., consumer premises equipment (CPE) 106 such as DSTBs, personal computers (PC) 212, converged premises devices (CPD) 210 discussed below, portable media devices (PMD) 208 such as personal MP3 players, 3G/4G smartphones, etc. It is noted that while particular embodiments using individual ones of these devices may require different components, delivery methods, etc., the present invention is intended to include delivery to each of these types of device; hence, the aforementioned devices (as well as other devices capable of receiving content from the aforementioned networks) will herein collectively be referred to as "user device(s)". An exemplary user device is discussed below with respect to FIG. 7.

Although illustrated as providing primary content from an on-demand server 105, it is appreciated that the apparatus and methods of the invention may be further utilized to provide other types or forms of primary content. For example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be provided. Other types of content may also be utilized consistent with the invention as well, including traditional linear broadcast content.

As illustrated in FIG. 2a, an application server (AS) 104 and VOD server 105 are in communication with a zone control and preservation server (ZCPS) 200. As will be discussed in greater detail below, the ZCPS 200 of the present invention is in one implementation configured to facilitate the use of legacy VOD servers 105 to provide on-demand content with appropriate (e.g., zone-preserved) targeted secondary content (e.g., advertisements) to legacy and non-legacy user devices. The secondary content may be provided from a secondary content source 201 to the VOD server 105 for incorporation into the primary content provided thereby.

In one embodiment, the AS 104 comprises an application server of the type discussed in co-owned, co-pending U.S. patent application Ser. No. 11/263,015 filed Oct. 2, 2002 and entitled "NETWORK BASED DIGITAL INFORMATION AND ENTERTAINMENT STORAGE AND DELIVERY SYSTEM", incorporated herein by reference in its entirety. In one variant, the AS 104 is a Mystro™ server device of the type utilized by the Assignee hereof, although it will be appreciated that other configurations may be utilized with equal success. The Mystro Application server is configured to receive a request for content from the user device and extract therefrom the service group identifier (Service_Group_id). The Mystro server may then look up the zone associated with the service group identifier as discussed herein.

The AS 104 monitors and records the content reserved and viewed by a user, and thus can be used to vary secondary content inserted therein prior to distributing a program to the user devices, e.g., CPE 106, PMD 208, PC 212, etc. Hence, the AS 104 may assist in providing zone-preserved secondary content, and may further be useful in additional targeting of secondary content (as will be discussed below).

Various methods are known in the art for providing secondary content insertion. For example, in one variant, the methods and apparatus discussed in co-owned, co-pending U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", which is incorporated herein by reference in its entirety, may be utilized in conjunction with the present invention. As discussed therein, a network operator's on-demand product portfolio (e.g., single selection/purchase VOD, SVOD, FVOD, etc.) is leveraged as a platform for the insertion of multiple different types of targeted secondary content (including for example zone-preserved secondary content), offered as placement opportunities to prospective or existing advertisers. In one variant, a replacement model is given whereby one or more segments of secondary content are used to replace one or more segments of secondary content currently resident within a primary content element. For example, the segments may be replaced "one-for-one", "one-for-N", or "N-for-one". In another variant, a fill model may be used to insert secondary content into primary content which does not otherwise have secondary content inserted therein, and/ or may be used to increase the frequency of inserted secondary content therein. Lastly, an additive model may be used to insert secondary content in a non-disruptive fashion into primary content which does not otherwise have secondary content inserted therein, and/or non-disruptively increase the frequency of inserted secondary content. In one example, the fill model may insert secondary content according to user-initiated interruptions, thereby appearing non-disruptive to the viewer.

In another embodiment, secondary (e.g., advertising) content may be inserted using the methods and apparatus discussed in co-owned, co-pending U.S. patent application Ser. No. 11/974,700 filed on Oct. 15, 2009 and entitled "METHODS AND APPARATUS FOR REVENUE-OPTIMIZED DELIVERY OF CONTENT IN A NETWORK", which is incorporated herein by reference in its entirety. As discussed therein, when a user device tunes to a specific program, it may have one or more specific revenue implications to the network operator. In one example, the device may be associated with a subscriber that the operator has identified as a target customer for personal advertisement. The network operator can maximize or optimize revenue by e.g., using an advertising "splicer" in conjunction with a network device such as a server (e.g., a VoD server). In one exemplary embodiment, the splicer entity is located at the VOD or other content server, thereby requiring the acquisition of only one stream. The splicer splices targeted advertising content into a stream delivered to that user; this "micro-zoned" output may be constructed at time of program stream configuration. Hence using the VOD server as a splicer/stream generator for multicast feeds may assist in providing a highly economical hardware model for the implementation of BSA microcasting. However, a "dedicated" splicer approach may also be used for the repurposing VOD assets to provide a less complex and more elegant solution which reduces real-time acquisition (RTA) costs significantly.

The splicer in the above embodiment may be of the type discussed in co-pending and co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE" (published as patent publication No. 20050060745 on Mar. 17, 2005), which is incorporated by reference herein in its entirety. Exemplary advertising insertion and splicer apparatus and methods are discussed therein in the context of, e.g., networked digital video recorder (NDVR) or VoD delivery paradigms.

The ZCPS 200 of FIG. 2a is further in communication with the billing system 152 and the Digital Network Control System (DNCS)/Content Management System (CMS), which are collectively referred to herein as the "network controller" 204. The ZCPS 200 uses information gained from these entities for making secondary content zone preservation decisions. The outcome of these decisions is passed to the primary content server (e.g., VOD server 105) for implementation.

The VOD server 105 may further receive instruction regarding secondary content insertion from e.g., a campaign manager (not shown) such as that discussed in co-owned, U.S. patent application Ser. No. 12/503,772 filed on Jul. 15, 2009, issued as U.S. Pat. No. 8,935,721 on Jan. 13, 2015, and entitled "Methods and Apparatus for Classifying an Audience in a Content Distribution Network", which is incorporated herein by reference in its entirety. As discussed therein, data relating to audience or viewer qualities is identified, created and distributed to an advertisement management system and an advertisement decision maker. An advertising "inventory" is created and related to audiences by combining the audience data with advertisement placement opportunities. The advertising inventory is managed via e.g., a network-based management system including a campaign manager. The apparatus and methods discussed are further adapted to manage advertising campaigns for one or more advertisement/promotional providers in order to, for example, increase advertising or associated sales revenue for an MSO, as well as to increase the likelihood a particular advertiser will reach its targeted audience as precisely as possible (and within any limitations of an advertiser-MSO defined relationship).

Also illustrated in FIG. 2a, the VOD server 105 provides on-demand content to a plurality of user devices via the network 101. The user devices serviced by the VOD server 105 may include e.g., legacy STB, IP devices (such as PC 212), and other, non-legacy devices such as consumer premises equipment (CPE) 106, converged premises devices (CPDs) 210, portable media devices (PMDs) 208, and media bridge 206. In one embodiment, the VOD server 105 may be "multi-purposed" for delivery of the selected content to the IP devices (and the legacy devices) using the apparatus and methods discussed in co-owned, co-pending U.S. patent application Ser. No. 11/284,427 filed on Nov. 21, 2005 and entitled "METHODS AND APPARATUS FOR PROVIDING VIDEO ON DEMAND AND NETWORK PVR FUNCTIONS USING IP STREAMING", which is incorporated herein by reference in its entirety. Specifically, the foregoing application discloses methods and apparatus for supporting e.g., on-demand content services, using conventional non-IP based VOD servers. These methods and apparatus, through the use of a protocol converter and/or a content redirector, can be used to enable a conventional VOD server to supply content to CPE device which support IP based content delivery and/or RSTP control of content delivery. The protocol converter can be implemented for example as an RTSP-ISA Proxy. The RTSP Proxy converts messages between RTSP (Real-Time Streaming Protocol) to the appropriate ISA protocol signal or another protocol format. The proxy module handles the conversion between these formats, and converts a received signal, e.g. message, into the format required by the device which responds by implementing the operation requested by the signal. Other techniques may be used consistent with the present invention as well.

The CPD 210 of FIG. 2a may for example be of the type described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. As discussed therein, the CPD 210 comprises a WLAN (e.g., Wi-Fi) and/or PAN (e.g., Bluetooth or 802.15) wireless interface. Packetized (e.g., IP) traffic may be exchanged between the CPD 210 and a PMD 208 via, e.g. the WLAN/PAN interface. Hence, in one embodiment, the PMD 208 may request on-demand content from the CPD 210 and in turn, via the CPD 210 receive the requested content as well as zone-preserved secondary content from the VOD server 105. The content is sent to the PMD 208 (which may include e.g., a cellular telephone, smartphone, personal media player, handheld computers, PDA, etc.) via a suitable complementary wireless interface via a wireless connection.

Also illustrated at FIG. 2, a media bridge apparatus 206 may be in communication with the network 101. The media bridge apparatus 206 may be for example of the type disclosed in co-owned, co-pending U.S. patent application Ser. No. 12/480,597 filed Jun. 8, 2009 and entitled "MEDIA BRIDGE APPARATUS AND METHODS", incorporated herein by reference in its entirety. As discussed therein, the media bridging apparatus 206 acts as a connection between a PMD 208 (which may include e.g., an iPod™, handheld computer, smartphone, PDA, etc.) and a user's home network. This bridging apparatus 206 may be used, for example, to convert content stored on the PMD 208 to a format capable of being presented on a user's set-top box or other client device. The bridging apparatus 206 may also be utilized for transmitting content to the PMD 208 (such as by converting the content to a format capable of being stored/presented on the PMD 208) provided the user of the PMD 208 is authorized to receive the content. In this manner, the PMD 208 may receive zone-preserved secondary content from the VOD server 105 as discussed elsewhere herein.

In yet another embodiment (not shown), the CPE 106 may comprise a personal video encoder (PVE) or comparable device. For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. The delivered content may comprise both the requested content as well as zone-preserved secondary content as discussed herein.

Figure 2B:
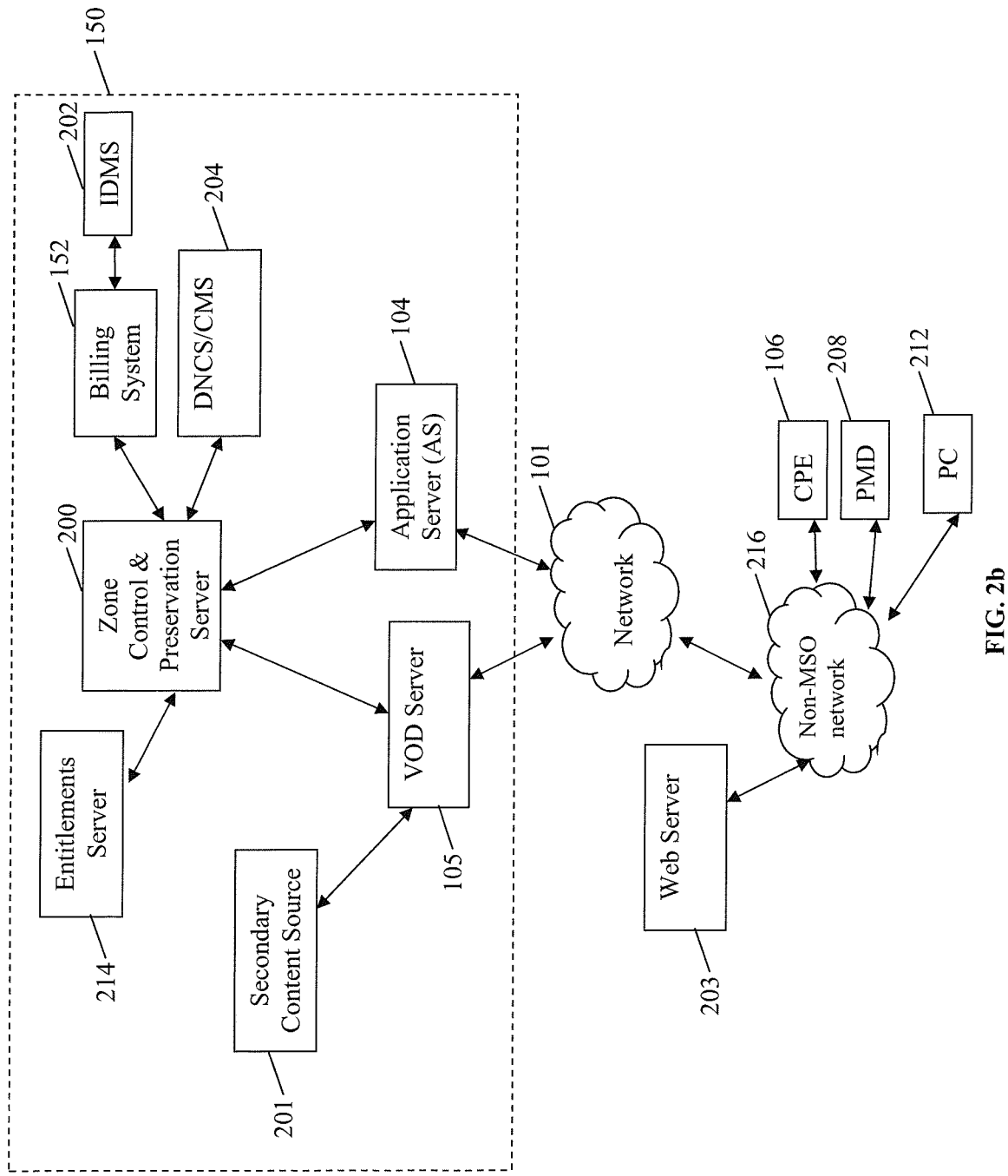
FIG. 2b is a functional block diagram illustrating a second exemplary network configuration for zone-preserved secondary content delivery to devices outside an MSO network according to the present invention.

Referring now to FIG. 2b, a second exemplary network configuration for zone-based targeted secondary content delivery according to the present invention is illustrated. The network configuration of FIG. 2b is used to provide content to a plurality of devices outside the MSO network (yet which are associated in some fashion with an MSO subscriber or account). As shown, the network of FIG. 2b further includes an entitlements server 214 for delivery of content to a non-MSO network 216. The non-MSO network 216 may comprise for example a wireless (e.g., WLAN) or cellular service provider network, an internet service provider network, etc., and is utilized to provide content to a plurality of user devices including e.g., a PC 212, CPE 106 and PMD 208 outside the traditional MSO network. According to this embodiment, the user devices (such as PC 212) request content from a web server 203 in communication with the VOD server 105 (via the non-MSO 216 network and the MSO network 101) and acting as an intermediary therebetween. Additional or alternative devices may be directly or indirectly serviced by the non-MSO network as well.

Since the content is leaving the MSO network, an entitlements server 214 is utilized to ensure that the content is being delivered only to authorized users. However it is appreciated that the entitlements server 214 functions may be utilized in the embodiments discussed above where the content does not leave the MSO network (e.g., FIG. 2a). The entitlements server 214 comprises a plurality of data records which indicate the devices that are associated with a subscriber's account. When a request is received, the entitlements server 214 is queried to determine whether the requesting device is among the devices registered to a subscriber.

In one embodiment, the entitlements of the user to receive requested content are determined utilizing the systems and methods discussed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", incorporated herein by reference in its entirety. As discussed therein, in one embodiment, a request for content is received from the user device at the network 101. The request is forwarded to a network entity which obtains information identifying the user account (such as subscriber identification number, account number, etc.) and uses this information to request entitlements from an entitlements server 214 (also located at the headend in one embodiment). The entitlements server 214 accesses subscription information in a subscriber database to obtain sufficient information to determine the entitlements of the subscriber; and based on the results returned from the entitlements server 214, the network entity either grants or denies the request.

Figure 2C:
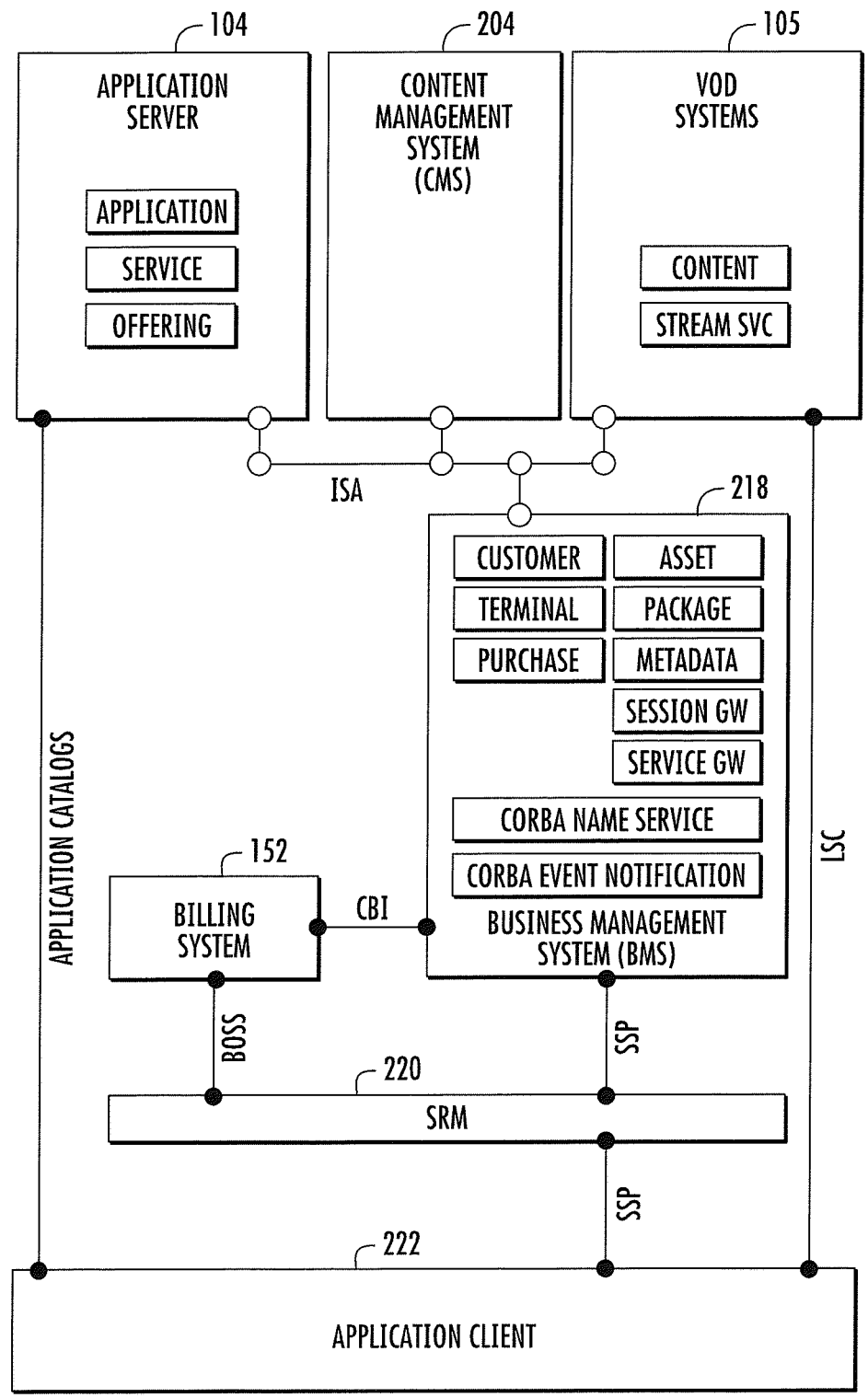
FIG. 2c is a functional block diagram illustrating a typical prior art software architecture used for providing VOD content over a content distribution network.

FIG. 2c illustrates an exemplary prior art software architecture for providing VOD services within a content-based in network. As shown, an application running on the client device 222 communicates via the network 101 to a session resource manager (SRM) 220 using the session setup protocol (SSP). The SRM 220 is responsible for session establishment, and controls the allocation of resources to the client device. The SRM 220 controls the provision of e.g., VOD content using information gained from the Billing System 152 and Business Management System (BMS) 218.

The client application 222 may request and receive application catalogs (having information regarding available content) from the application server 104. The client application 222 may be utilized to enable a user to sort through a plurality of available content and select one or more content items for display, recording, etc.

As noted above, the SRM 220 is in communication with the BMS 218 via SSP and in communication with the Billing System 152 via a Billing Operations Support Systems (BOSS) interface. The BMS 218 and Billing System 152 communicate with one another via a Customer Billing Interface (CBI).

As previously discussed, a correct advertising zone may be determined for a legacy STB and its client application 222 through use of a Service Group ID (Service_Group_id). Specifically, when the VOD client on the STB requests a primary content element (e.g. video), the Service_Group_id is contained in the requesting message. The application server 104 receives the message, extracts the Service_Group_id, performs a lookup to determine which advertising zone is associated with that Service_Group_id, and then instructs the VOD server 105 to serve the appropriate version of the requested video which contains the secondary content associated with the STB's advertising zone. Content may then be provided from the VOD server 105 to the client using lightweight stream control protocol (LSCP).

As illustrated in FIG. 2c, the application server 104, CMS 204 and VOD server 105 communicate with one another and with the BMS 218 via an Interactive Services Architecture (ISA). The ISA may be the specific protocol implemented by the Assignee hereof, however other architecture for the communication between these entities enabling interactive services may be utilized as well.

Figure 2D:
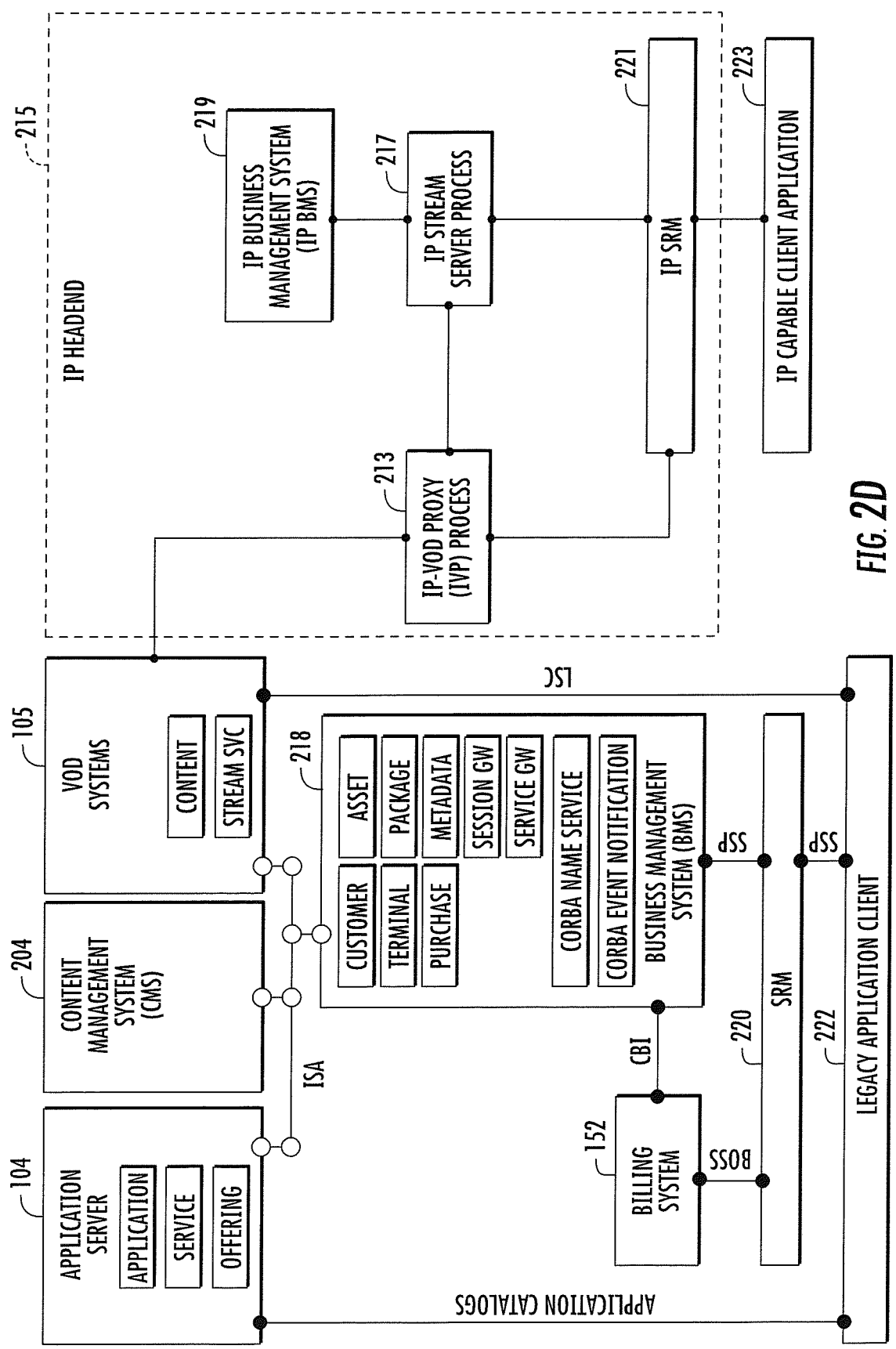
FIG. 2d is a functional block diagram illustrating one embodiment of a software architecture for use in the exemplary network configurations of FIGS. 2a and 2b.

Referring now to FIG. 2d, one embodiment of the improved software architecture according to the invention for use in the exemplary network configurations of FIGS. 2a-2b is illustrated. It will be appreciated that while this architecture is based largely on the aforementioned extant ISA of FIG. 2c, this is merely for purposes of clarity of illustration, and the invention is in no way limited to an ISA or any other particular environment.

As shown in FIG. 2d, the legacy architecture of FIG. 2c is extended via the addition of (i) an IP-enabled client application 223 running on an IP client device; (ii) an IP SRM 221; (iii) an IP stream server function 217; (iv) an IP BMS 219, and (v) an IP-VOD proxy 213. The aforementioned components (less the client application 223) can be considered to form an "IP headend" 215 of sorts. It is appreciated that in many instances the IP session resource manager may be optional. For example, the IP SRM may be useful in networks where bandwidth needs to be reserved on the IP network or where it is anticipated that demand for content could exceed the number of individual streams that the IP video servers could handle simultaneously.

In operation, the aforementioned components operate in a generally comparable fashion to their counterpart legacy portion of the architecture, except for IP-encapsulated content. The IP client 223 sends a request to the IP SRM, the latter which establishes a session with the IP client 223. The IP stream server is used to receive content streams from the VOD server, and deliver the IP-encapsulated content stream(s) via the session (subject to authorization by the IP BMS), and zone control/preservation is maintained via information exchanged between the legacy VOD server and the stream server via the IVP 213.

Using any of the architectures discussed in FIGS. 2a-2b (and 2d), content may be delivered to a plurality of user devices. For example, VOD content is in certain networks commonly stored on the VOD server 105 as either MPEG-2 or MPEG-4 containers wrapped in a MPEG-2 transport stream (MPEG-2TS). The VOD server 105 typically implements a well-known set of communication protocols or interfaces in order to communicate with the CPE (including e.g., legacy STB), with the BMS 218, CMS 204, and the application server 104. As noted above, the application server 104 also may provide information to the user device about the programming available via the VOD system and the navigation of that programming information.

As discussed above, the present invention advantageously allows e.g., non-legacy devices (such as e.g., an IP device) to receive video content with the appropriate embedded advertisements from the legacy VOD storage solutions (i.e., the VOD server 105 and/or web server 203). The non-legacy devices may also access video from the VOD server 105 rather than from an IP-specific video server as is needed in the prior art.

In one embodiment, the architectures discussed above (FIGS. 2a, 2b, 2d) use an IP-VOD Proxy (IVP) software process 213. The IVP translates session control messages from the non-legacy IP devices into the protocol formats used by the legacy device VOD platforms (such as e.g., the SSCP discussed above). Session control messages include e.g., messages requesting a video to play, stop, fast forward, rewind, pause, known as "trick-mode" commands, as well as other out-of-band control messages, such as fragment size negotiation, etc.

The actual video files on the VOD server 105 go through a transport layer adaptation process that converts the aforementioned MPEG2-TS into the appropriate protocols for delivery to a non-legacy device (for example converting to Real Time Messaging Protocol (RTMP), RTMPT, RTMPTS, RTMFP, RTP/RTCP, etc.). The IVP process 213 can also translate ISA messages destined to and from the SRM 220 into another format; e.g., packet cable multimedia (PCMM)-based COPS messages to allocate QoS resources on e.g., a DOCSIS network. The IVP can also be used to "pretend" to deliver messages to/from the SRM 220 when the video traffic is destined for a device that is served by an unmanaged (e.g., non-MSO) network such as the Internet, upon which no QoS reservations are made in order to enable the SRM 220 to track the resources of the VOD server 105.

In the exemplary embodiment, the proxy functionality of the IVP process 213 is of the type discussed in co-owned, co-pending U.S. patent application Ser. No. 11/284,427 entitled "METHODS AND APPARATUS FOR PROVIDING VIDEO ON DEMAND AND NETWORK PVR FUNCTIONS USING IP STREAMING", previously incorporated herein (e.g., an RTSP-ISA Proxy Module), although other approaches and configurations may be used with equal success.

Zone-Controlled Secondary Content Delivery Methods—

Under the prior art approaches discussed above, correct advertisement zones are determined for legacy user devices by learning the Service Group ID (Service_Group_id) of the device from the edge quadrature amplitude modulator (eQAM) to which it receives video when the device boots up. Each eQAM is manually configured to be associated with a Service_Group_id. When the VOD client on the user device requests a video, the Service_Group_id is contained in the requesting message. The application server 104 receives the message, extracts the Service_Group_id, performs a lookup to determine which advertisement zone is associated with that Service_Group_id, and then instructs the VOD server 105 to serve the appropriate version of the requested video which contains the advertisements associated with the requesting device's advertisement zone.

However, as noted, the prior art does not provide mechanisms for ensuring that the correct advertisements are sent to the correct non-legacy devices from a "legacy" VOD server 105. The present invention provides methods for performing this and other functions (i.e., zone-controlled secondary content delivery).

Figure 3:
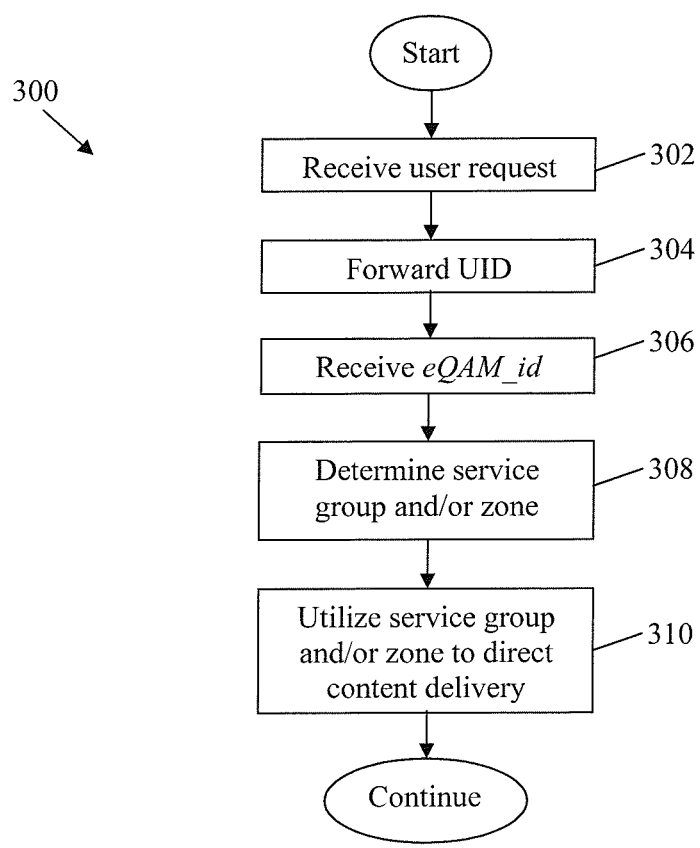
FIG. 3 is a logical flow diagram illustrating an exemplary method for providing zone-controlled secondary content delivery according to the present invention.

Referring now to FIG. 3, a first exemplary embodiment of the method for zone-preserved secondary content delivery is illustrated. Per step 302, a user request for primary content delivery is received. The user request includes a user identifier (UID). The UID for each individual user and is stored in a network entity, such as the Identity Management System (IDMS) (see FIG. 1*c*) or entitlements server 214 (FIG. 2*b*). For example, suppose a PC or other IP device user requests a video by requesting a URL associated with some video name; the video storefront (which may be managed by the application server 104) passes the UID to the ZCPS 200 (FIG. 2*a*); the ZCPS 200 contains a mapping of the eQAM identifier (eQAM_id) to service group identifier (Service_Group_id), and a mapping of the Service_Group_id to an advertisement zone identifier (advertisement zone_id). Each UID is associated with subscriber information in the billing system 152, which is associated with the Media Access Control (MAC) addresses of all of the devices on that subscriber's account. The MAC addresses are in turn associated with a hub identifier (hub_id) in the network controller 204 (e.g., the DNCS, the DAC, or the CMS); the hub_id is associated with an eQAM_id. Hence, at step 304, the ZCPS 200 forwards the UID to the billing system 152 to receive the MAC address which is forwarded to the network controller 204. The network controller 204 then returns the eQAM_id to the ZCPS 200 (step 306).

Next, per step 308, the ZCPS 200 uses the eQAM_id to determine the user's associated Service_Group_id and/or advertisement zone_id.

Lastly, at step 310, the ZCPS 200 uses the Service_Group_id and/or advertisement zone_id to direct content delivery. For example, the on-demand video server 105 is instructed by the ZCPS 200 (via the aforementioned Service_Group_id and/or advertisement zone_id) to provide the appropriate video stream to the PC or IP device that is associated with the service group identity and/or advertisement zone identity. It is noted that the video storefront (e.g., as controlled by the application server 104) may be configured to request a video based upon either the service group identity and/or advertisement zone identity. It is further noted that multiple service groups can be associated with a single advertisement zone.

Figure 4:
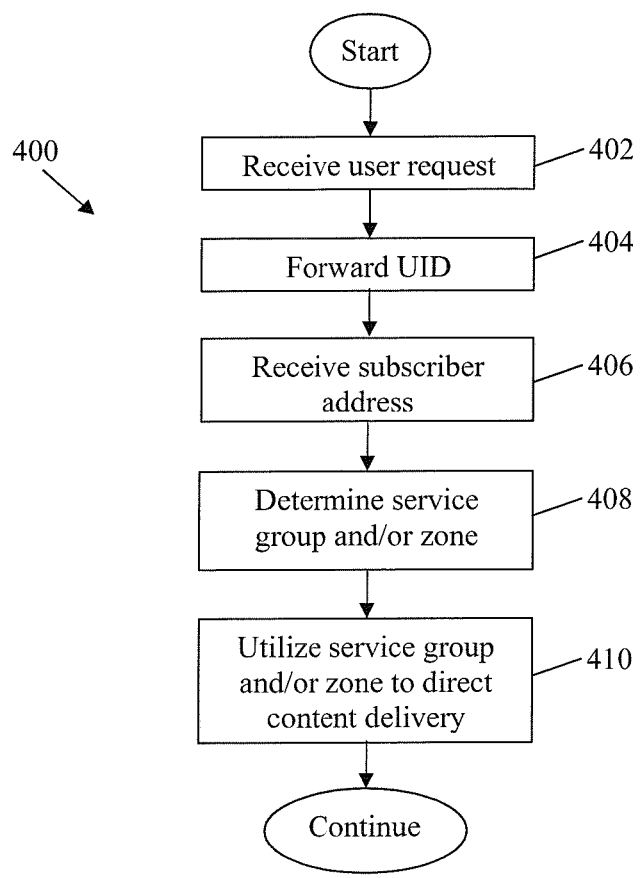
FIG. 4 is a logical flow diagram illustrating a second exemplary method for providing zone-controlled secondary content delivery according to the present invention.

Referring now to FIG. 4, a second exemplary embodiment of the method for ensuring that the correct advertisements are sent to the correct non-legacy devices from a legacy VOD server 105 is illustrated. The method of FIG. 4 advantageously does not depend on using a device associated with the user (e.g., subscriber) to derive an advertisement zone identity. Hence, the method of FIG. 4 may be useful for providing content to e.g., shared or otherwise un-registered IP devices. In this manner, a subscriber may access content from any device and, in conjunction, receive advertisements which the subscriber would have received on his/her legacy device had he/she requested that same content (or alternatively according to a prescribed rule set).

Per step 402 of the method, a user request is received from a client device for access to content. As above, the request includes the UID.

Next, per step 404, the ZCPS 200 forwards the UID to billing system 152.

At step 406, the billing system 152 returns a subscriber billing address information associated with the UID.

Then, per step 408, the ZCPS 200 uses the subscriber billing address information (or a portion thereof such as zip code, area code, etc.) to map to a service group and/or advertisement zone associated with the geographic area of the service address. The service_group_id and/or advertisement zone_id is then utilized to direct content delivery at the VOD server 105 (step 410).

Delivery to a Remote Network—

In another embodiment of the invention, the determination of an advertisement zone may be utilized in conjunction with the insertion of advertisements according to a user's actual location (versus e.g., their address of record as in FIG. 4). For example, suppose programming and advertising content that is available to a subscriber over the cable network is also made available via other (secondary) networks such as the Internet, LANs/WANs/MANs, a wireless service provider (WSP) network, cellular service provider (CSP) network, or even a satellite network (see e.g., FIG. 2*b*). A user seeking access to content over the non-MSO network may, rather than receiving the same advertisements the user would have received had the request originated from a legacy device, instead receive advertisements specific to the actual location of the user (rather than the location of the legacy devices). A promotion for a sports event for a local team, or local news, etc. might have limited applicability to a subscriber who is not currently located in the original geographic area. Accordingly, one embodiment of the invention uses secondary content that contains geographic metadata when stored, the metadata being used as the basis for insertion based on a particular geographic location determined by e.g., the MAC and IP address of the requesting device (see FIG. 5 below), or other mechanisms such as for example: (i) association with a WiFi AP having known location; (ii) association or communication with a WiMAX cell or base station having a known location; or (iii) receipt of GPS coordinates that can be used by the user device (or another entity, such as one in the MSO network) to locate the requesting device.

In one variant, the methods and apparatus discussed in co-owned, co-pending U.S. patent application Ser. No. 11/440,490 entitled "PERSONAL CONTENT SERVER APPARATUS AND METHODS" and filed May 24, 2006 may be utilized to provide the aforementioned secondary content insertion functions based on the location of the user.

The secondary content inserted for delivery to devices outside the MSO network may further be implemented or restricted according to a rules set. For example, a user may specify that, when content is requested from a "remote" network or location, advertisements specific to the user's location should be provided. Alternatively, the user may specify that he/she would like to continue receiving advertisements specific to his/her "home" location, even though the request is received from outside that geographic area. The MSO may also specify rules for the delivery of secondary (e.g., advertising) content, for example, the MSO may dictate whether the advertisements should match the geographic area of delivery (e.g., the remote location) or should match the geographic area generally associated with the user (e.g., the user's "home").

Additionally, rule sets may provide time-based qualifications for the delivery of secondary content. For example, the rule sets (whether selected by the user or the MSO, or some combination thereof) may indicate that secondary content which has a particular time/date association may only be provided if the delivery time/date matches, or is prior to the relevant period. In one example, it may be determined that a user should receive an advertisement for "American Idol";

the advertisement has "date relevance" data which indicates that the advertised event (the particular broadcast of "American Idol" with which the advertisement is contextually associated) will occur at 9:00 P.M. in the Pacific Time Zone (which corresponds to 6:00 P.M Eastern). Suppose also that the user travels to New York (Eastern Time Zone) and the time of the delivery of the advertisement is 7:00 P.M. Eastern. Since the broadcast time for the advertised event has passed before the user is to receive the advertisement, this advertisement will not be presented to the user. Hence, the rules set may prohibit delivery of "old" advertisements (e.g., advertisements which have date/time expirations).

Figure 5:
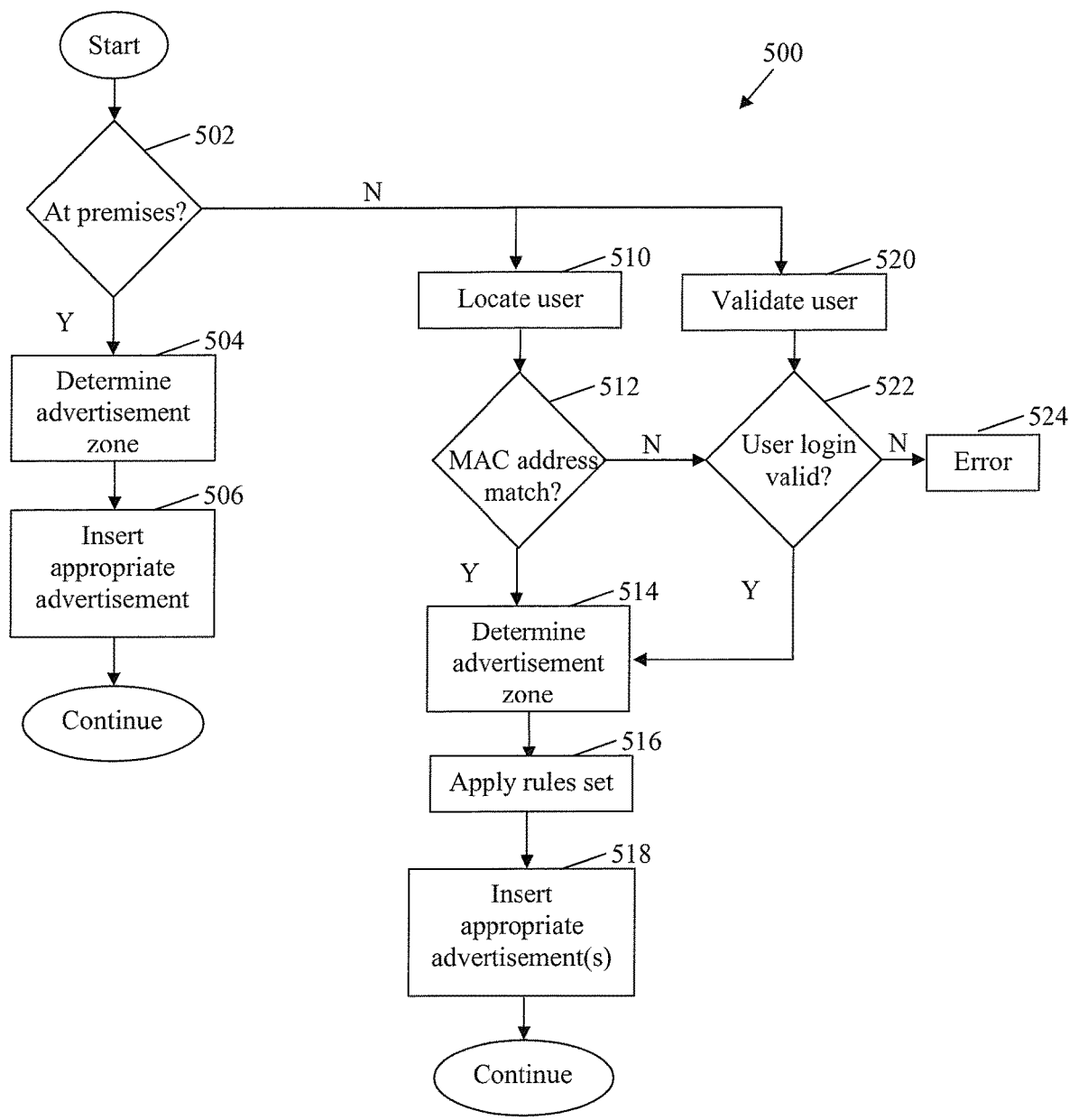
FIG. 5 is a logical flow diagram illustrating an exemplary method of utilizing the methods of FIGS. 3 and/or 4 to provide zone-controlled secondary content delivery according to a rules set.

Referring now to FIG. 5, an exemplary method for applying a rules set to the delivery of zone-controlled secondary content in a remote network is illustrated. Per step 502 of the method, it is determined whether the request for content has originated from the user's premises or from a remote location. This may be determined based on e.g., the pathway through which the request was received. For example, if the pathway indicates that the request merely traversed MSO entities, it may be assumed the user requested content from his/her premises; if however, the pathway of the request indicates that the request traversed non-MSO entities (such as a web server), then it is likely the user requested content from a location outside the his/her premises. Other techniques may be used as well, such as those noted previously herein (i.e., IP address, WiFi AP location, WiMAX association, GPS, etc.).

If the request originated from the user premises, per step 504 the method of either FIG. 3 or FIG. 4 is then used to determine an appropriate advertisement zone for the user or the user device.

Per step 506, the advertisements appropriate to the advertisement zone are then inserted into the requested content and the method continues.

If, at step 502, it is determined that the user is not making the request from his/her premises (i.e., the user is at a remote location), then per step 510 the user is located if not already done (using the aforementioned methods), and at step 520 the user is validated. Steps 510 and 520 may be performed simultaneously, or serially. Alternatively, only one of the steps may be performed, and the other comprising an optional step.

The user is located (step 510) by e.g., reviewing the IP address associated to the received request and determining at step 512 whether the MAC address of the requesting device matches a plurality of MAC address associated to a subscriber (such as is contained in a subscriber or account profile maintained by the MSO in the billing system or entitlements server 214 of FIG. 2a). If the MAC address does not match, in one embodiment, the method proceeds to the user login validation step (step 522). However, if the MAC address matches an address associated to a subscriber, then, per step 514, the advertisement zone is determined. As discussed above, the advertisement zone is determined in one variant using either of the methods discussed above (FIGS. 3 and 4).

At step 516, the rules set is applied. The rules set, as noted above, comprises one or more MSO- or user-specified rules which dictate the parameters of delivery of secondary content (e.g., advertisements). The rules set may be based on date/time expirations of certain content, thus disabling the delivery of expired content. In addition (or as an alternative), the rules set may specify whether the received advertisements should be related to the context of the primary content, related to the context of the network, related to the remote geographic location which the user is currently located, or related to a user context (e.g., at home, at work, visiting a client on the road, etc.).

At step 518, according to the advertisement zone and rules set, the appropriate advertisements are inserted into the requested content and the method continues.

The user is validated (step 520) by prompting the user to enter login or other validating information (such as a user identification and password). In one embodiment, the user login validation may utilize the methods and apparatus discussed in co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK", which is incorporated herein by reference in its entirety. As discussed therein, in one embodiment, a request for content is received from user device (e.g., PC 212, PMD 208, etc.) at an entity of the content distribution network. The network entity obtains information identifying the user account (such as subscriber identification number, account number, etc.) and uses this information to request entitlements from an entitlements server (located at the network headend 150 in one embodiment). Based on the results returned from the entitlements server, the network entity determines whether the login information is valid (step 522) and either grants or denies the request. The entitlements server accesses subscription information in a subscriber database to obtain sufficient information to determine the entitlements of the subscriber.

Note that the use of a user-specific login also advantageously enables user-specific targeted advertising (as may the MAC address of the device), if the MSO maintains data to that level of granularity. For instance, multiple different IP devices registered under a given subscriber account may correspond to individual family members, each having different preferences, demographics, psychographics, etc. If the MSO makes this association with data received, it can more finely target advertising to the requesting individual. This is particularly useful since account-based demographics, etc. may not be representative of all members of the population in that account. For example, a household associated with a subscription may have a gross or family income above $300K per year, yet the actual requester (e.g., child) may have no disposable income whatsoever, and hence an advertisement for a high end sports car or the like would be pointless and a waste of resources and impressions.

If the request is denied (the login information is not valid), then an error message will be displayed to the user at step 524. If the request is granted (the login information is valid), the method will proceed to step 514, where the advertisement zone is determined, the rules set is applied (step 516) and the appropriate advertisements are inserted (step 518).

The primary and secondary content may also be manipulated as part of the foregoing methods to perform all relevant advertising formats and schemes (e.g., bookends, replacement, pause, telescoping, etc.) on the content transferred by the network or from other content source. See, e.g., co-pending and co-owned U.S. patent application Ser. No. 10/662,776 filed Sep. 15, 2003 and entitled "SYSTEM AND METHOD FOR ADVERTISEMENT DELIVERY WITHIN A VIDEO TIME SHIFTING ARCHITECTURE", incorporated herein by reference in its entirety, which describes exemplary methods and apparatus for implementing the foregoing (and other) schemes and formats within the context of a content-based network.

Additional Targeting Mechanisms—

In another aspect of the invention, the secondary content may be further targeted based on one or more user- or content-specific characteristics e.g., may be targeted to the user, their use context, and/or device from which a request is received, as well as to the primary content requested. This capability is leveraged by the functionality provided by the present invention, including inter alia the ability of a user to issue a request from an on-net or off-net IP-based device, and have that device and/or user validated and associated with an advertising or other zone. For example, once the pool of available advertising or other secondary content is narrowed by the relevant "zone" (as discussed above), the pool may be further narrowed based on e.g., demographics, psychographics, etc. by using a dynamic secondary content (e.g., advertisement) insertion process which gives the network operator the opportunity to provide the secondary content tailored to or which is logically proximate to the context of the primary content (e.g., programming).

As used herein, the term "logically proximate" refers to secondary content which bears some direct or indirect logical relationship to the primary content. For example, a logically proximate advertisement for the movie "Pirates of the Caribbean" might be one for Disneyland, which includes a "Pirates of the Caribbean" theme ride.

Such functionality also allows for the substitution or replacement of secondary content which is less suited to the present context or environment, or which is dated (see discussion above regarding time-sensitive content), even though it may by synchronized or "preserved" with respect to what the subscriber might receive over their legacy STB. In the context of the foregoing exemplary promotion, the promotion might carry "date relevance" data or the like in the form of metadata, which can be read and evaluated by the ZCPS 200 or other entity.

Hence, information may be obtained, for example, relating to the demographics, or psychographics of the subscriber, capabilities of the requesting device, etc. in order to target the secondary content to be logically related to the context of the primary content, whether in conjunction with a defined "zone" (e.g., geographic zone), or independently.

The user context may also be exploited; e.g., knowing based on time of day which members of a household is most likely to be viewing the programming, etc., or making use of a user-supplied classification or context (e.g., at work, traveling, etc.). In another variant, the network context may also be exploited; i.e., delivery of secondary content which is properly encoded to be delivered over the relevant distribution path, which fits the allotted time, which maximizes bandwidth or profits, is compatible with the user's requesting device (e.g., 3G smartphone, which may only have certain codecs, etc.), and so forth.

For instance, the present invention contemplates zone "pairs" or "tuples" which slice the targeting in two or more dimensions. In one such implementation, a zone pair might comprise the cross-section or subset of users which: (i) are associated with a given geographic region, and (ii) are associated with a given demographic. As another example, the pair might comprise (i) a given demographic, and (ii) a given psychographic. As yet another example, a tuple might comprise {a, b, c}, where:

a=a geographic zone;
b=a demographic factor; and
c=a primary content or user "use" context.

Myriad other permutations and combinations will be recognized by those of ordinary skill given the present disclosure.

For example, the apparatus and methods discussed in co-owned, co-pending U.S. patent application Ser. No. 11/198,620 filed on Aug. 4, 2005 and entitled 7"METHOD AND APPARATUS FOR CONTEXT-SPECIFIC CONTENT DELIVERY", which is incorporated herein by reference in its entirety, may be utilized consistent with the present invention. As discussed therein, contextually-related "secondary" content (e.g., advertising messages, useful informational links, etc.) may be provided in association with other primary content selected by the user. In one exemplary embodiment, the secondary content is selected at least in part based on metadata associated with the primary content. The metadata may be provided by, e.g., the content originator or the network operator, and is sent to a network entity (e.g., advertising server) which returns contextually specific advertising matching the search terms. In one variant, the search term is simply one or more keywords drawn from the metadata and used as an input to a search engine. In another variant, more sophisticated analysis of the metadata is performed so as to ostensibly reduce the number of irrelevant or marginally relevant "hits" returned by the search engine/advertising server. Hence the pool of available secondary content may be narrowed not only by advertisement zone, but also by the context of the primary content.

Still further, the methods and apparatus discussed in co-owned, co-pending U.S. patent application Ser. No. 12/503,710 filed Jul. 15, 2009 and entitled "METHODS AND APPARATUS FOR TARGETED SECONDARY CONTENT INSERTION", which is incorporated herein by reference in its entirety, may be utilized as well. This embodiment is particularly useful in targeting content to a set of subscribers, such as those serviced by a local service node. As discussed therein, content targeted to a particular audience within a content-based network may be identified and inserted. For instance, the content is identified by analyzing audience or viewer qualities (i.e., psychographic, geographic, or demographic, characteristic or classifications) at a particular insertion opportunity using an advertisement management system (and associated advertisement decision maker process). The audience information can in one embodiment be gathered in real-time directly from users' CPE (i.e., set top boxes, cable modems, PC, etc.), thereby allowing information to be gathered which is specific to actual content viewers. Historical or other information relating to particular subscribers (or subscribers in general, or even the broader general population) may also be utilized in characterizing an audience. The advertisement management system then uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program where an impending placement opportunity will occur) to a set of audience qualifiers of a target audience of an advertisement. The placement opportunity can then be optimized for one or more variables (e.g., proximity, revenue, impressions, etc.) by selecting the best fitting advertisement for that opportunity within the advertisement zone of the requesting device.

The aforementioned methods and apparatus can advantageously provide content across multiple delivery platforms utilizing substantially extant network infrastructure and components compatible with a number of different client device and delivery systems including both wired and wireless technologies.

It will also be recognized that other types of information may also be included with the primary content that is delivered to the requester in the remote or visited network. For example, one variant of the invention comprises the inclusion of closed caption (cc) data, such as for example through use of the methods and apparatus described in co-pending and co-owned U.S. patent application Ser. No. 11/298,247 entitled "Caption Data Delivery Apparatus and Methods" filed Dec. 9, 2005 and incorporated herein by reference in its entirety. Similarly, emergency alert (e.g., EAS) data can be included for example using the methods and apparatus of co-pending and co-owned U.S. patent application Ser. No. 11/299,169 entitled "Emergency Alert Data Delivery Apparatus and Methods" also filed Dec. 9, 2005 and incorporated herein by reference in its entirety. This data may be geographically or contextually selected; e.g., EAS messages for the actual location of the requesting device, as described in the foregoing disclosure.

Zone Matching—

In yet another embodiment of the present invention, the "zones" discussed herein (such as e.g., advertisement zones) may be matched up to respective switched digital service group "zones". For example, one or more of the herein-discussed zones may be correlated to or restricted by what previously comprised a single service group (or alternatively two or more service groups that comprise a subset of the zone), thereby generally decreasing the size of each zone (measured by number of customers in each) from what it would be without such correlation or restriction.

Bandwidth constraints are reduced as a result of the zone matching discussed above. More specifically, the needs of the constituents of the smaller groups are often more similar to one another in terms of: (i) requested primary content; (ii) targeted secondary content, or both. Hence, similar primary and/or secondary content may be distributed to the zone across fewer channels, requiring less bandwidth.

It is further appreciated that the zoning approaches discussed herein, such as those based on service group correlation/restriction described above, may be re-aggregated and/or re-distributed to create different units than those associated with the current zone(s). For instance, if one or more patterns of viewership become apparent, this may be used as the basis for re-organizing one or more zones, such as based on geography.

Start-Over and Lookback Variants—

As noted above, the primary content may also be used in conjunction with so-called "start-over" content (as described in previously incorporated co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE") and/or "lookback" content (as described in previously incorporated co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE").

The aforementioned services "harvest" linear broadcast content for storage on the VOD platforms (e.g., VOD server 105). The harvested start-over and/or lookback content is then made available to subscriber devices during a window of time after the original airing time. For start-over content, the window may be much smaller and may be more strictly tied to the broadcast time. For example, if the program Lost (episode #100) is broadcast from 8 PM to 9 PM on some Tuesday night, a file is captured that contains that episode of Lost, placed on the MSO VOD server, and made available for some period of time (for example, 3 days after the original airing time as "lookback" content). After the time period expires, the content is no longer available.

In one embodiment, secondary content which was originally included in the broadcast remains embedded in the video file that is stored on the VOD server 105. Further, some of the content may be "ad-insertable", meaning that the MSO has the rights and ability to insert advertisements (or other secondary content) into the programming at pre-determined intervals.

According to the present invention, the aforementioned stored primary content may be provided to devices in different advertisement zones. Hence, for each advertisement insertion opportunity, a different advertisement may be inserted depending on the different geographic region of the requesting devices.

For example, suppose a single MSO division is divided into 20 zones; the episode of "Lost" may be stored 20 different times, with each stored instance containing the advertisements appropriate for each of the 20 zones. Alternatively, the program may be stored only one time on the VOD servers 105 in a series of components or segments which begin and end at advertisement insertion breaks. According to this embodiment, a playlist may then be created which "stitches" the pieces of the primary content and the different advertisements (different based on zone) together to provide the program with the correct embedded advertisements appropriate for the subscriber's advertisement zone.

Server Device—

Figure 6:
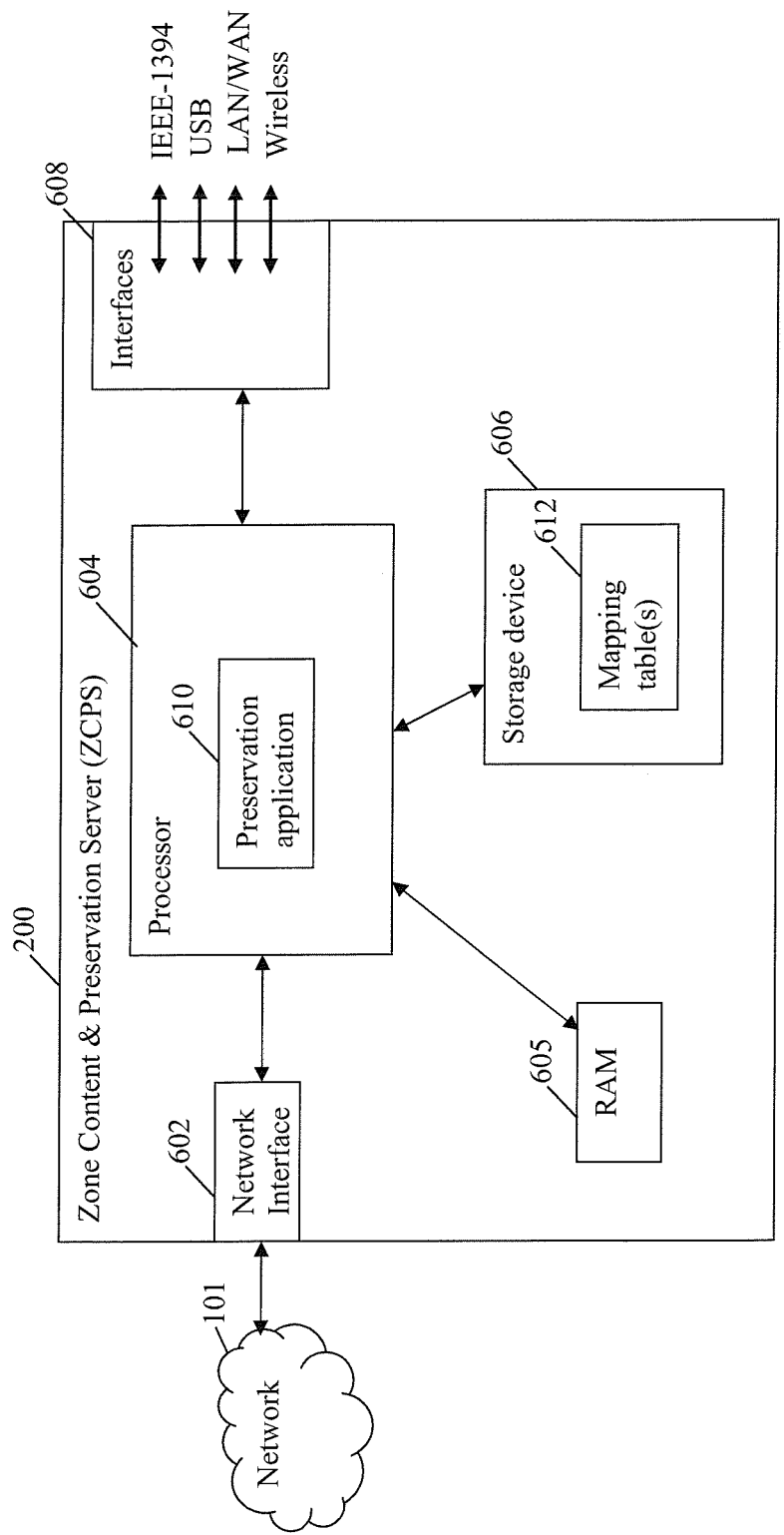
FIG. 6 is a functional block diagram illustrating an exemplary zone preservation server (ZCPS) for use in the present invention.

Referring now to FIG. 6, one exemplary embodiment of a zone control (preservation) server 200 of the type shown in FIGS. 2a and 2b herein is described. It will be appreciated that while described in the context of providing zone-based targeted secondary content in conjunction with the provision of on-demand (OD) primary content, the server 200 may be adapted for use with other primary content delivery mechanisms within the network as well (e.g., linear or switched broadcast, etc.).

As shown in FIG. 6, the exemplary server device 200 generally comprises an OpenCable-compliant network server module including a digital processor(s) 604, RAM 605, mass storage device 606, and a plurality of interfaces 608 for connection with other network apparatus such as LANs, the local service node hardware, IP routers and other packet network devices, network management and provisioning systems, local PCs, etc. Other components which may be utilized within the server device 200 (depending on where it is employed and how it is physically implemented) include RF tuner stages, modulators/demodulators, encryption/decryption, amplifiers, board level electronic components, as well as media processors and other specialized SoC or ASIC devices. Support for various processing layers and protocols (e.g., 802.3, DOCSIS MAC, OOB channels, DHCP, SNMP, UDP, SNMP, H.323/RTP/RTCP, VoIP, SIP, GigE, etc.) may also be provided as required.

The digital processor 604 comprises at least one zone control/preservation application 610. The preservation application 610 comprises a series of executable code which runs on the processor 604 and when executed provide for the zone control and preservation functionality discussed above. For example, in one embodiment (see e.g., FIG. 3), the application 610 may be configured to: (i) receive the user request including UID, (ii) forward the UID to the billing system 152, (iii) receive the MAC address, (iv) forward the MAC address to the network controller 204, (v) receive the eQAM_id, and (vi) consult e.g., the mapping tables 612 to determine the user's associated Service_Group_id and/or advertisement zone identity based on the eQAM_id. The preservation application 610 may further be configured to use Service_Group_id and/or advertisement zone identity to generate one or more messages which are transmitted to the VOD server 105 and direct the delivery of secondary content therefrom.

In another embodiment (see e.g., FIG. 4), the zone preservation application 610 may be configured to: (i) receive the user request including UID, (ii) forward the UID to the billing system 152, (iii) receive the subscriber billing address, and (iv) consult e.g., the mapping tables 612 to determine the user's associated Service_Group_id and/or advertisement zone identity based on the subscriber billing address. As above, the preservation application 610 may further be configured to use Service_Group_id and/or advertisement zone identity to generate one or more messages which are transmitted to the VOD server 105 and direct the delivery of secondary content therefrom.

The mapping tables 612 may include e.g., a first set of tables mapping one or more eQAM_ids to a Service_Group_id and a second set of tables mapping each Service_Group_id to an advertisement zone_id.

The zone control/preservation application 610 may be configured to perform the user location and user validation functionalities discussed above with respect to FIG. 5. Hence, the application may enable the ZCPS 200 or entitlements server to perform a determination of whether the MAC address of a requesting device matches those registered to a user, and/or perform a determination of whether the user-entered login information is valid. Based on these determinations, the application 610 may proceed with the aforementioned advertisement zone determination functions discussed above.

In another embodiment, the ZCPS 200 may further comprise a rule set implementation application (not shown). This application enables the ZCPS 200 to utilize both MSO- and user-specified rules of the type previously described herein in the selection of advertisements for delivery to a user. Storage of the rules sets may be at the ZCPS 200, or alternatively, at another entity in communication therewith. It is further appreciated that access to the stored rules may be granted to certain MSO entities and/or the user upon proper validation/verification.

The ZCPS 200 of FIG. 6 may take any number of physical forms, comprising for example one of a plurality of discrete modules or cards within a hub or head-end component of the type well known in the art. The server 200 may also comprise firmware, either alone or in combination with other hardware/software components such as those previously described. Alternatively, the server 200 may be a stand-alone device disposed at the hub, head-end, or other location. Numerous other configurations may be used. The ZCPS 200 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the zone control preservation functionality described above may take the form of one or more computer programs running on a single device disposed within the network (such as the ZCPS 200). As yet another example, portions of the functionality may be rendered as a dedicated or application specific IC (ASIC) having code running thereon, or a distributed application across multiple entities (e.g., ZCPS, VOD server, billing system, entitlements server, etc.). Myriad different configurations for practicing the server device of the invention will be recognized by those of ordinary skill in the network arts provided the present disclosure.

Exemplary CPE—

Figure 7:
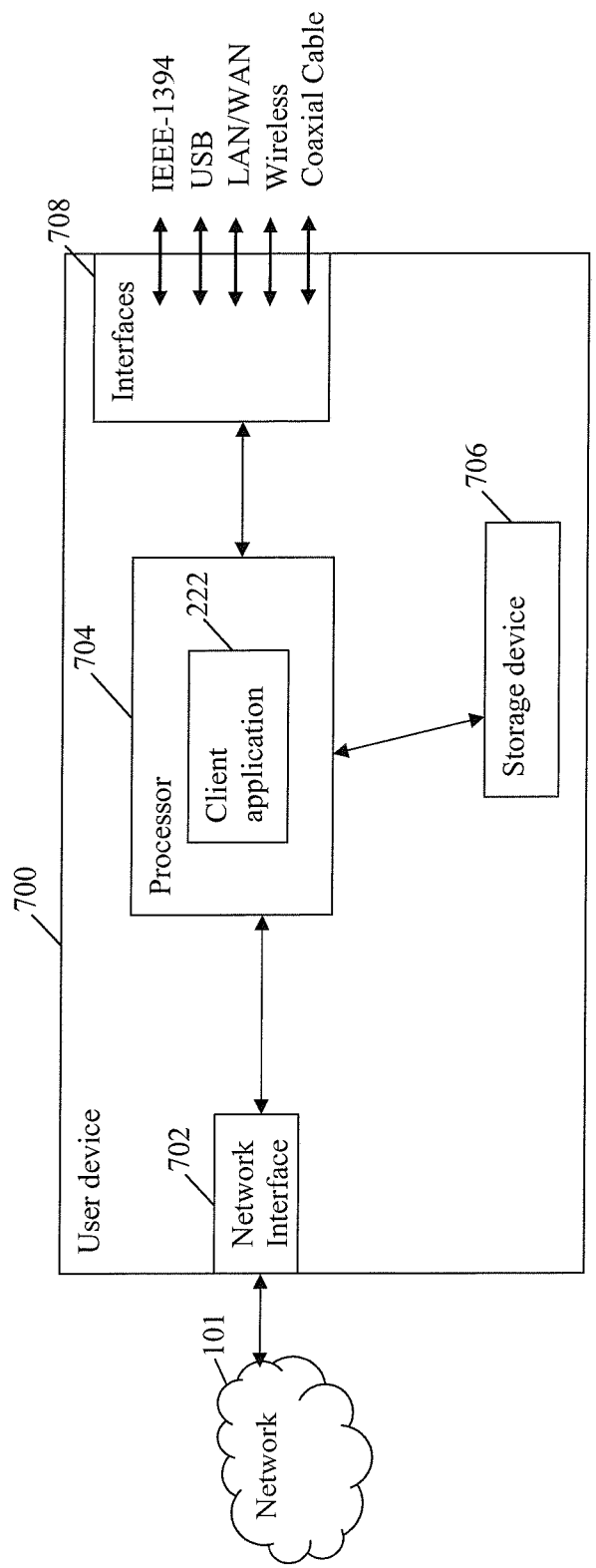
FIG. 7 is a functional block diagram illustrating an exemplary user device for use in the present invention.

FIG. 7 illustrates an embodiment of an IP-enabled user device 700 according to the present invention. As noted above, the term "user device" is used generally to refer to any number of client apparatus (including without limitation CPE 106, PC 212, CPD 210, PMD 208, etc.) useable with the present invention, the following embodiment being merely exemplary.

As shown in the simplified diagram of FIG. 7, the device 700 generally comprises a network interface 702 for communication with the content provisioning network 101 (or non-MSO network 216 (not shown)). The device comprises an OpenCable-compliant embedded system (e.g., DSTB) having an RF front end (including tuner and demodulator/decryptors) for interface with the aforementioned network 101. In one variant, interface with the network comprises tuning to and demodulating one or more DOCSIS QAMs over which the IP-encapsulated packet content streams are received.

The user device 700 further includes one or more digital processor(s) 704, storage device 706, and a plurality of optional interfaces 708 (e.g., video/audio interfaces, IEEE-1394 "FireWire", USB, HDMI, serial/parallel ports, etc.) for interface with other end-user apparatus such as televisions, personal electronics, computers, WiFi or other network hubs/routers, etc. Various other components may also optionally be utilized within the device 700 include various processing layers (e.g., DOCSIS MAC or DAVIC OOB channel, MPEG, etc.) as well as media processors and other specialized SoC or ASIC devices. In certain embodiments, the device 700 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The processor 704 of the exemplary user device 700 comprises at least one client application 223. The client application 223 comprises a series of executable code which run on the processor 704 and when executed facilitate the zone preservation functionality discussed above. For example, the client application 223 may be configured to: (i) communicate with the SRM 220, (ii) request and receive the application catalogs, (iii) provide a UID to the network 101 (and ultimately the ZCPS 200), and (iv) receive content from the network 101.

The device 700 of FIG. 7 may also be provided with an OCAP compliant application and Java-based middleware which, inter alia, manages the operation of the device and applications running thereon. It will be recognized by those of ordinary skill that myriad different device and software architectures may be used consistent with the tuning and channel request functions of the present invention. For example, different middlewares (e.g., MHP, ARIB, or ACAP) may be used in place of the OCAP middleware discussed herein. Alternatively, no middleware may be needed, the aforementioned functions simply being provided by the browser.

The exemplary device 700 may further comprise a conventional "Watch TV" application or the like, which services those program or user channels available over the network. The Watch TV application, residing in memory, provides such functions as channel navigation control, channel selection in response to a channel change event, etc.

In another embodiment, the Watch TV application further comprises all necessary functionality need to support both the channel request features previously described herein (i.e., comprises the client application 223 previously described).

The device 700 also includes a TCP/IP (Transport Control Protocol/Internet Protocol) transport layer/network layer stack which enables IP decapsulation of received content (and optionally encapsulation of content received from e.g., a connected media capture device).

It will be recognized that while an IP enabled device for use "on net" (i.e., IP DSTB) having an RF stage and tuner is described herein, other types of IP enabled devices may be configured for "off net" communication as previously described, such as via another PHY such as WiFi, WiMAX, Ethernet LAN, cellular (e.g., UMTS, LTE/LTE-A, GSM), DSL, HFCu, satellite, and so forth.

It will also be recognized that while the foregoing methodology and apparatus is described in the context of a server-centric targeting paradigm (i.e., where the zone preservation server 200 or other network server performs the zone preservation functions), a more CPE-centric approach can be utilized, such as where the CPE generates or otherwise is assigned an identifier indicating an advertisement zone. The CPE may then provide the identifier to the ZCPS 200 which uses this information to direct the VOD or other content server's secondary content insertion decisions. For instance, the CPE might have protocol support for messaging between itself and another network entity to obtain the requisite identifier, or alternatively may be able of generating the identifier itself, such as based on a priori knowledge of its placement within the network, knowing its geographic location independently (such as association with a wireless node, or via AGPS), or yet other approaches.

Operations/Business Rules Engine—

In another aspect of the invention, the aforementioned zone control/preservation server 200 (e.g., rendered as one or more computer programs) includes a so-called "rules" engine. This engine comprises, in an exemplary embodiment, a series of software routines running on the ZCPS 200 or other associated hardware/firmware environment adapted to control the operation of the algorithms previously described. These rules may also be fully integrated within the ZCPS 200 itself, and controlled via e.g., a GUI on a PC connected thereto. In effect, the rules engine comprises a supervisory entity which monitors and selectively controls, via the ZCPS 200, the control/preservation and secondary content targeting functions at a higher level, so as to implement desired operational or business rules.

The rules engine can be considered an overlay of sorts to the ZCPS 200 algorithms. For example, the ZCPS 200 may invoke certain operational protocols or decision processes based on requests received from the user devices, demographic data, geographic data, etc. However, these processes may not always be compatible with higher level business or operational goals, such as maximizing profit or system reliability. Hence, when imposed, the business/operational rules can be used to dynamically (or even manually) control the operation of the ZCPS 200 and the messages which are relayed therefrom to the content servers (e.g., VOD server 105). The rules may be, e.g., operational or business-oriented in nature, and may also be applied selectively in terms of time of day, duration, specific local areas, or even at the individual user level. They may also implement the aforementioned user- or MSO-specified rule sets.

For example, one rule implemented by the rules engine may comprise only providing zone preservation or targeted advertising to certain classes of subscribers (e.g., those at a premium level of service, since these subscribers may be considered to have the highest revenue potential or likelihood of responding to the targeted advertisement).

Another rule might impose a moratorium on establishing or generating new versions of available content (directed towards different zones) until a certain minimum threshold of requests have been received.

Yet another rule might comprise enforcement of the aforementioned time-based restrictions; e.g., prohibit delivery of advertisements which have date/time expirations.

It will also be appreciated that advertisers may be tiered with only certain tier advertisements being delivered to devices in certain zones. For example, it may be known through historical usage or purchase data that certain zip codes or geographic zones will tend to respond better to increased targeted advertising than other zip codes (say, due to the increased disposable income of residents in that zip code). Hence, an advertiser's budget is most effectively used when their advertisements are included in streams which are requested by devices in such zip codes. An MSO might also be able to charge a premium rate for advertising within such channels, since the advertiser's expected yield is typically higher in these rather than other zip codes. Accordingly, the MSO might invoke a business rule (such as via the business engine of the ZCPS 200) which selectively provides only "premium" advertisements to the best zones (such as by zip code, etc.), while providing second-tier advertisements into other zones.

It will be appreciated that less "binary" approaches than those described above may be utilized consistent with the invention, whether in the context of providing zone-based targeting, other targeted advertising, etc. Specifically, the foregoing approach to zone-based targeted advertising effectively provides one of two states for the stream containing the targeted advertisement; i.e., delivered or not delivered. This approach has the advantage of simplicity, in that little real intelligence is required for implementation. In one embodiment, however, a supervisory process (e.g., algorithm) may comprise a fuzzy logic, Bayesian, or similar approach to classify individual requesting device into one of two categories in terms of a particular advertisement context (e.g., "enthusiast" or "non-enthusiast"), which can then be used as the sole (or at least partial) basis for delivering or not delivering a particular advertisement to the designated device. This logic may be used on top of or in conjunction with zone-based logic to further target advertisements within a zone (e.g., by demographics, psychographies, etc.). The categorization may be based, for example, on aggregated historic (anecdotal) data for that subscriber which is pooled irrespective of other considerations (such as, e.g., the day of the week, the particular family member viewing, and/or the time of day).

Additional business rules useful with the invention may include the utilization of individual or device-specific controls. Suppose for example that certain content is inappropriate for certain viewers (e.g., adult programming which is inappropriate for children). Accordingly, when it is determined that the receiving device is owned by or currently being used by a person who is among those people for whom the content is inappropriate, such content will not be delivered thereto. In the context of the aforementioned advertisement insertion, if the person receiving content is determined to be a child (such as by determining the device is owned or operated by a child), inappropriate advertisements, or interactive TV advertisements, are not provided to that child/device and/or to that zone. The determination of who is receiving the content may be made in a variety of ways, such as e.g.: (i) via a user-specific login or profile; (ii) via the request being associated with a member of a subscriber account (e.g., a mobile device known to be owned and operated by a member of a family), and/or (iii) via association with a user-specific environment (see, e.g., co-owned and co-pending U.S. patent application Ser. No. 12/414,554 file Mar. 30, 2009 entitled "Personal Media Channel Apparatus and Methods", incorporated herein by reference in its entirety, which describes a user- or group-specific profile environment and supporting virtual channel approach).

In another exemplary embodiment, advertisements may be selected for insertion based on whether that advertisement was viewed by the customer, zone, and/or device previously. In other words, if a zone has previously received a first advertisement (or alternatively, received and has had one or more confirmed viewings of the received advertisement), the advertisement insertion processes (discussed above) may select a second advertisement rather than providing the first advertisement again.

Many other approaches and combinations are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized apparatus configured to operate in a network, the computerized apparatus comprising:
   interface apparatus configured for data communication with a mobile user device;
   processor apparatus;
   network interface apparatus in data communication with the processor apparatus; and
   storage apparatus in data communication with the processor apparatus, the storage apparatus comprising at least one computer program configured to, when executed on the processor apparatus:
      receive data representative of a request for digitally rendered primary content from the mobile user device, the data representative of the request comprising user identification data;
      obtain, based at least in part on the user identification data, subscriber billing address information relating to a user associated with the mobile user device;
      utilize at least a portion of the subscriber billing address information to identify a zone associated to the user;
      cause utilization of data relating to the identified zone to enforce a rule regarding selection and transmission of appropriate advertising to non-legacy client devices, including the mobile user device, the transmission from a legacy video on-demand (VOD) server; and
      cause at least one digitally rendered secondary content element to be inserted into the requested digitally rendered primary content for delivery to the mobile user device based at least in part on stored data relating to the rule.

2. The computerized apparatus of claim 1, wherein the mobile user device comprises an Internet Protocol (IP)-enabled device, and the data representative of the request for the digitally rendered primary content is received from the mobile user device disposed in a geographic location outside a geographic location of the zone associated to the user.

3. The computerized apparatus of claim 1, wherein:
   the rule further requires selection of the at least one digitally rendered secondary content element selected from among a plurality of digitally rendered secondary content elements is further based at least in part on data relating to a correspondence of one or more tiers of the at least one digitally rendered secondary content element to the identified zone associated to the user, the correspondence based at least in part on a comparison of the one or more tiers of the at least one digitally rendered secondary content element to a profit-based qualification associated with the identified zone, such that one or more of the plurality of digitally rendered secondary content elements of a first tier are delivered to a first zone and have a greater number of targeting opportunities than those of one or more of the plurality of digitally rendered secondary content elements of a second tier that are delivered to a second zone, and the first zone having profitability opportunities greater that those of the second zone; and
   the profit-based qualification is associated with disposable incomes of one or more subscribers of the network, the one or more subscribers residing in the identified zone associated to the user.

4. The computerized apparatus of claim 1, wherein the digitally rendered primary content is stored as a plurality of data segments, and the delivery of the digitally rendered primary content to the mobile user device comprises creation of a single data stream comprising the plurality of segments having data of the at least one digitally rendered secondary content element inserted between at least two of the plurality of data segments.

5. The computerized apparatus of claim 1, wherein the plurality of instructions are further configured to, when executed on the processor apparatus:
   evaluate a subscription level of the user; and
   based at least on the evaluation indicating that the subscription level does not meet a prescribed criterion, cause insertion of the at least one digitally rendered secondary content element into the requested digitally rendered primary content for delivery to the mobile user device irrespective of the rule.

6. A computerized method of operating a network, comprising:
   receiving data representative of a request for digitally rendered primary content from a mobile client device, the data representative of the request comprising user identification data;

transmitting the user identification data to a network computerized process;
based at least on the transmitting, receiving subscriber billing address data associated with the user identification data;
utilizing at least a portion of the subscriber billing address data to identify a zone associated with a user of the mobile client device;
algorithmically creating a rule regarding selection and transmission of appropriate digitally rendered secondary content elements to non-legacy client devices, including the mobile client device, wherein the selection is based at least in part on the identified zone, and the transmission is configured to be effected from a legacy video on-demand (VOD) server apparatus; and
causing at least one digitally rendered secondary content element to be inserted into the requested digitally rendered primary content for delivery to the mobile client device based at least in part on the rule.

7. The computerized method of claim 6, further comprising:
receiving data regarding one or more placement opportunities for insertion of the at least one digitally rendered secondary content element into the digitally rendered primary content; and
receiving data regarding an audience associated with the one or more placement opportunities for the at least one digitally rendered secondary content element, the audience comprising the user of the mobile client device;
wherein the algorithmically creating the rule comprises utilizing at least (i) the data regarding the one or more placement opportunities, and (ii) the data regarding the audience.

8. The computerized method of claim 7, further comprising causing storage of the digitally rendered primary content as a plurality of data segments;
wherein:
the causing of the at least one digitally rendered secondary content element to be inserted into the requested digitally rendered primary content comprises creating a single data stream comprising the plurality of segments, the single stream data having the at least one digitally rendered secondary content element inserted between at least two of the data segments of the stream at the one or more placement opportunities;
the data regarding one or more placement opportunities comprises data indicative of at least one restriction to a selection of the at least one of at least one digitally rendered secondary content element, the at least one restriction comprising a restriction of the selection to only digitally rendered secondary content elements optimized for respective ones of a plurality of delivery platform types, the plurality of delivery platform types comprising at least one of: VOD or pay-per-view (PPV), linear television, interactive television, Internet, or electronic or interactive program guides; and
the data regarding the audience comprises demographic data.

9. The computerized method of claim 6, wherein:
the receiving the data representative of the request for the digitally rendered primary content from the mobile client device comprises receiving the data representative of the request for the digitally rendered primary content from the mobile client device which is then-currently located in a geographic location outside of a geographic zone where a computerized legacy device of the user of the mobile client device is then-currently located;
the identified zone comprises the geographic zone; and
the mobile client device comprises at least an Internet Protocol (IP)-enabled device.

10. Computer readable apparatus comprising a non-transitory storage medium, the non-transitory storage medium comprising at least one computer program having a plurality of instructions, the plurality of instructions configured to, when executed on a processing apparatus:
receive data representative of a request for digitally rendered primary content from a computerized non-legacy client device of a user, the data representative of the request comprising user identification data;
obtain subscriber billing address data associated with the user identification data;
based on at least a portion of the subscriber billing address data, identify one or more secondary content zones associated with the user;
formulate, via a first computerized process configured to utilize data associated with the one or more secondary content zones, a rule relating to selection of digitally rendered secondary content for delivery thereof from a legacy video on-demand (VOD) server apparatus of a managed content delivery network and to the computerized non-legacy client device; and
cause the rule to be implemented with respect to the request for the digitally rendered primary content, the implementation comprising insertion of the digitally rendered secondary content in the digitally rendered primary content.

11. The computer readable apparatus of claim 10, wherein the plurality of instructions are further configured to, when executed on the processing apparatus:
receive data relating to a preference regarding a plurality of digitally rendered secondary content, the preference configurable by the user via a computerized user interface of the computerized non-legacy client device; and
wherein the first computerized process is further configured to utilize the data relating to the preference in the formulation of the rule.

12. The computer readable apparatus of claim 11, wherein the identification of the one or more secondary content zones comprises determination of a geographical location of a computerized legacy device associated with the user, the computerized legacy device in data communication with the computerized non-legacy client device via at least one of the managed content delivery network or an unmanaged internetwork.

13. The computer readable apparatus of claim 12, wherein:
the receipt of the data relating to the preference regarding a plurality of digitally rendered secondary content comprises receipt of data indicative of a preference regarding a type of advertising the user desires to receive at the computerized non-legacy client device, the type relating to at least one of (i) the geographical location of the computerized legacy device, or (ii) a then-current geographical location of the computerized non-legacy client device;
the one or more secondary content zones correspond to at least one of (i) the geographical location of the computerized legacy device, or (ii) the geographical location of the computerized non-legacy client device; and the geographical location of the computerized legacy device comprises a known fixed location of a premises of the user.

14. The computer readable apparatus of claim 10, wherein the causation of the rule to be implemented comprises automatic causation of the rule to be implemented based on data indicative of a number of requests for the digitally rendered secondary content meeting or exceeding a predetermined threshold.

15. The computer readable apparatus of claim 10, wherein the implementation further comprises generation of one or more variants of the digitally rendered secondary content, the one or more variants being specific to the one or more secondary content zones, respectively.

16. The computer readable apparatus of claim 15, wherein at least one of the one or more variants specific to at least one of the one or more secondary content zones comprises advertising related to a feminine product delivered to a secondary content zone having predominantly female audience.

17. The computer readable apparatus of claim 10, wherein the plurality of instructions are further configured to, when executed on the processing apparatus:
- evaluate data of an account associated to the user to determine one or more characteristics associated with the user and generate data indicative of the one or more characteristics;
- wherein the first computerized process is further configured to utilize data relating to a context of the digitally rendered secondary content that is appropriate for the one or more characteristics based at least on comparison of at least a portion of the generated data indicative of the one or more characteristics and metadata of the digitally rendered secondary content, in the formulation of the rule.

18. The computer readable apparatus of claim 17, wherein the plurality of instructions are further configured to, when executed on the processing apparatus:
- algorithmically analyze the metadata of the digitally rendered secondary content to determine the context thereof.

19. Computerized network apparatus configured to operate in a data network, the computerized network apparatus comprising:
- data interface apparatus configured to receive data representative of a request for digitally rendered primary content, the data representative of the request (i) originating from a computerized mobile device, and (ii) comprising at least user identification data associated with a user of the computerized non-legacy client device;
- digital processor apparatus; and
- storage apparatus in data communication with the digital processor apparatus, the storage apparatus comprising at least one computer program configured to, when executed on the digital processor apparatus:
  - transmit the user identification information to a computerized network entity of the data network;
  - based at least on the transmission of the user identification information, receive billing address data from the computerized network entity;
  - utilize at least a portion of the billing address data to identify at least one secondary content zone;
  - algorithmically determine a rule regarding selection and transmission of appropriate digitally rendered secondary content for the computerized mobile client device, wherein the selection is based at least in part on the identified zone, and the transmission is configured to be effected from a legacy-based video on-demand (VOD) server apparatus; and
  - cause the rule to be implemented at least with respect to the request for the digitally rendered primary content, the implementation comprising insertion of the appropriate digitally rendered secondary content in the digitally rendered primary content.

20. The computerized network apparatus of claim 19, wherein the selection is further based at least on data relating to a subscription level associated with either the computerized mobile device or a user thereof.

21. The computerized network apparatus of claim 19, wherein the selection is further based at least on data relating to an expiration date of the digitally rendered secondary content, the expiration date comprising a prescribed date after which digitally rendered primary content was originally broadcasted.

22. The computerized network apparatus of claim 19, wherein:
- the receipt of the data representative of the request for digitally rendered primary content comprises receipt of the data representative of the request for digitally rendered primary content indirectly from a computerized legacy client device.

23. The computerized network apparatus of claim 19, wherein the computerized network entity comprises a computerized billing process configured to provide the billing address data.

24. The computerized network apparatus of claim 19, wherein the digitally rendered primary content is stored at the legacy-based computerized VOD server apparatus as a plurality of segments, and the provision of the digitally rendered primary content and the digitally rendered secondary content to the computerized mobile device comprises creation of a single data stream comprising the plurality of segments having one or more elements of the digitally rendered secondary content inserted therein.

* * * * *

UNITED STATES PATENT AND TRADEMARK OFFICE
CERTIFICATE OF CORRECTION

PATENT NO. : 10,863,238 B2
APPLICATION NO. : 14/252686
DATED : December 8, 2020
INVENTOR(S) : Peter Stern et al.

Page 1 of 1

It is certified that error appears in the above-identified patent and that said Letters Patent is hereby corrected as shown below:

On the Title Page

Item (74) Currently Reads:
"(74) Attorney, Agent, or Firm – Gadzinski & Associates, PC"

Should Read:
--(74) Attorney, Agent, or Firm – Gazdzinski & Associates, PC--

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*